(12) United States Patent
Harrison et al.

(10) Patent No.: US 9,355,079 B2
(45) Date of Patent: May 31, 2016

(54) READER MODE PRESENTATION OF WEB CONTENT

(71) Applicant: Apple Inc., Cupertino, CA (US)

(72) Inventors: David Frank Harrison, Boulder Creek, CA (US); Jing Jin, Sunnyvale, CA (US); Kevin Decker, San Jose, CA (US); Michael Paul Thole, San Francisco, CA (US); Dan Bernstein, San Francisco, CA (US)

(73) Assignee: APPLE INC., Cupertino, CA (US)

( * ) Notice: Subject to any disclaimer, the term of this patent is extended or adjusted under 35 U.S.C. 154(b) by 50 days.

(21) Appl. No.: 14/018,218

(22) Filed: Sep. 4, 2013

(65) Prior Publication Data

US 2014/0026034 A1  Jan. 23, 2014

Related U.S. Application Data

(62) Division of application No. 12/794,674, filed on Jun. 4, 2010, now Pat. No. 8,555,155.

(51) Int. Cl.
  *G06F 3/0481* (2013.01)
  *G06F 17/22* (2006.01)
  *G06F 17/30* (2006.01)

(52) U.S. Cl.
  CPC ...... *G06F 17/2247* (2013.01); *G06F 17/30899* (2013.01)

(58) Field of Classification Search
  CPC .................................................. G06F 17/30899
  USPC .................................................. 715/234, 772
  See application file for complete search history.

(56) References Cited

U.S. PATENT DOCUMENTS

| | | | | |
|---|---|---|---|---|
| 6,300,947 B1 * | 10/2001 | Kanevsky | ......... | G06F 17/30905 707/E17.121 |
| 6,542,173 B1 * | 4/2003 | Buckley | .............. | G06F 3/04847 358/1.9 |
| 6,788,316 B1 * | 9/2004 | Ma | .................... | G06F 17/30899 707/E17.119 |
| 7,159,011 B1 * | 1/2007 | Knight | .............. | G06F 17/30864 707/999.003 |
| 7,512,905 B1 * | 3/2009 | Scott | ..................... | G06F 17/218 715/713 |
| 7,647,550 B1 * | 1/2010 | Nguyen | ............ | G06F 17/30902 715/206 |
| 8,156,419 B2 * | 4/2012 | Choudhary | ....... | G06F 17/30902 715/209 |

(Continued)

OTHER PUBLICATIONS

Screenshot of readability feature developed by Arc90Lab, Publishe on Dec. 2009, 10 pages.*

(Continued)

*Primary Examiner* — Reza Nabi
(74) *Attorney, Agent, or Firm* — Morgan, Lewis & Bockius LLP

(57) ABSTRACT

Methods and apparatuses that automatically detect availability of a reader mode for article content in a web page addressed by a URL are described. Availability detection may be progressively performed such that cheap operations are performed first to reduce the need to perform more expensive ones. A retrieval status of the web page may be detected to determine when enough content has been retrieved to initiate a detection of the reader mode for the web page. A reader indicator may be presented in a user interface of a browser if the availability of the reader mode is detected. A user of the browser may be noted with an alternative presentation of the article content from the web page in addition to a presentation of the whole web page by the browser. If the reader mode of the web page is not available, no reader indicator may be present in the browser.

19 Claims, 13 Drawing Sheets

(56) References Cited

U.S. PATENT DOCUMENTS

| | | | | |
|---|---|---|---|---|
| 8,555,155 | B2* | 10/2013 | Harrison | G06F 17/30899 709/203 |
| 8,610,926 | B2* | 12/2013 | Kyoda | G06F 3/1204 358/1.15 |
| 8,620,849 | B2* | 12/2013 | Moitra | G06F 17/30864 706/50 |
| 8,700,985 | B2* | 4/2014 | Leper | G06F 17/30899 715/230 |
| 8,751,953 | B2* | 6/2014 | Forstall | G06F 17/30905 715/781 |
| 2002/0077900 | A1* | 6/2002 | Thompson | G06Q 30/02 705/14.68 |
| 2002/0093505 | A1* | 7/2002 | Hill | G06F 17/212 345/543 |
| 2004/0049737 | A1* | 3/2004 | Simon Hunt | G06F 17/30905 715/238 |
| 2004/0128618 | A1* | 7/2004 | Datta | G06F 17/30902 715/234 |
| 2004/0148571 | A1* | 7/2004 | Lue | G06F 17/30905 715/239 |
| 2004/0191746 | A1* | 9/2004 | Maron | G09B 7/02 434/323 |
| 2005/0027788 | A1 | 2/2005 | Koopmans et al. | |
| 2005/0097458 | A1* | 5/2005 | Wilson | G06F 17/243 715/252 |
| 2006/0036955 | A1* | 2/2006 | Baudisch | G06F 3/0481 715/747 |
| 2006/0061682 | A1* | 3/2006 | Bradley | H04N 5/46 348/441 |
| 2006/0230355 | A1 | 10/2006 | Nurmi | |
| 2007/0073777 | A1* | 3/2007 | Werwath | G06F 17/30905 |
| 2007/0150484 | A1* | 6/2007 | Funge | G06F 17/30056 |
| 2008/0168388 | A1* | 7/2008 | Decker | G06F 3/0481 715/800 |
| 2008/0177747 | A1* | 7/2008 | Yeung | G06F 17/30011 |
| 2008/0275890 | A1* | 11/2008 | Chakrabarti | G06F 17/3089 |
| 2008/0275901 | A1* | 11/2008 | Chakrabarti | G06F 17/30864 |
| 2008/0281827 | A1* | 11/2008 | Wang | G06F 17/278 |
| 2008/0301540 | A1* | 12/2008 | Sava | G06F 17/211 715/205 |
| 2008/0307301 | A1* | 12/2008 | Decker | G06F 17/30905 715/241 |
| 2008/0307328 | A1* | 12/2008 | Hatcher | H04L 12/5835 715/760 |
| 2009/0051692 | A1* | 2/2009 | Gralley | G06T 13/80 345/473 |
| 2009/0248707 | A1* | 10/2009 | Mehta | G06F 17/212 |
| 2009/0254850 | A1* | 10/2009 | Almeida | G06F 8/65 715/772 |
| 2009/0262094 | A1 | 10/2009 | Lin | |
| 2009/0319342 | A1* | 12/2009 | Shilman | G06F 17/30864 705/7.41 |
| 2010/0053644 | A1* | 3/2010 | French et al. | 358/1.9 |
| 2010/0095219 | A1* | 4/2010 | Stachowiak | G06F 17/30884 715/745 |
| 2010/0115388 | A1* | 5/2010 | Nguyen | G06F 17/30902 715/205 |
| 2010/0115408 | A1 | 5/2010 | Mujkic et al. | |
| 2010/0162139 | A1* | 6/2010 | Beebe | G06F 17/30861 715/760 |
| 2010/0299620 | A1* | 11/2010 | Sharma | G06F 17/248 715/760 |
| 2010/0313108 | A1* | 12/2010 | Lueck | G06F 17/30905 715/205 |
| 2010/0313159 | A1* | 12/2010 | Decker | H04L 67/02 715/772 |
| 2011/0099294 | A1* | 4/2011 | Kapur | H04L 67/02 709/246 |
| 2011/0119571 | A1* | 5/2011 | Decker | G06F 17/30902 715/205 |
| 2011/0242610 | A1* | 10/2011 | Fan | H04N 1/00795 358/3.27 |
| 2011/0302524 | A1* | 12/2011 | Forstall | G06F 17/30905 715/781 |
| 2012/0011428 | A1* | 1/2012 | Chisholm | G06F 17/241 715/230 |
| 2012/0230555 | A1* | 9/2012 | Miura | G06K 9/00087 382/124 |

OTHER PUBLICATIONS

J. Prasad et al., CoreEx: Content Extraction from online news articles, Technical Report 2008-15, Standford University, May 2008.*

Screenshot of readability feature developed by Arc90Lab, Published on Dec. 2009, 10 pages.

J. Prasad et al., CoreEx: Content Extraction from online news articles, Technical Report 2008-15, Stanford University, May 2008.

Rahman et al., Content Extraction from HTMl documents, 1st workshop on Web Document Analysis (WDA 2001), 2001.

Readability—An Arc90 Lab Experiment, 2 pages, Jun. 4, 2010.

* cited by examiner

300
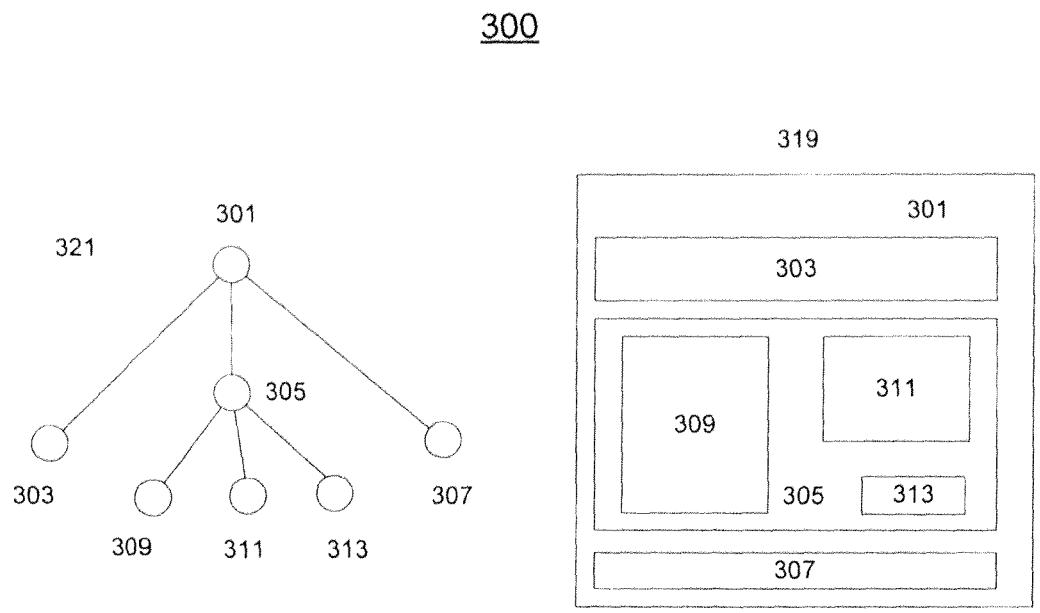
Fig. 3A
Fig. 3B
Fig. 3C

400

Determining a status of content retrieval for a web page addressed by a URL (Universal Resource Locator), the status to indicate whether to initiate a detection of a reader mode of the web page 401

Progressively detecting availability of an article content from the web page according to the content received, if the status to initiate the detection is determined 403

500

Presenting a reader indicator in a user interface of the browser if the availability of the article content is detected, the reader indicator indicating an alternative presentation of the article content from the web page in addition to a presentation of the web page by the browser, wherein the reader indicator is absent if the alternative presentation is not available 405

Identifying a title of article content associated with an element of a web page, the element indicating availability of the article content in the web page 601

↓

Optionally, identifying a link (e.g. a URL) from the web page, the link indicating where to locate a next page of the article content 603

↓

Determining one or more separate elements of the web page representing consecutive portions of the article content, the one or more separate elements including the element 605

↓

Pruning a DOM structure representing the one or more separate elements of the web page to preserve texts of the article content for presentation in a reader mode 607

↓

Updating the pruned DOM structure to impose a presentation style for the article content in the reader mode 609

↓

Presenting the article content in the reader mode according to the updated DOM structure while optionally preloading the next page of the article content 611

Fig. 6

READER MODE PRESENTATION OF WEB CONTENT

This application is a divisional of co-pending U.S. application Ser. No. 12/794,674, filed on Jun. 4, 2010.

FIELD OF INVENTION

The present invention relates generally to user interface. More particularly, this invention in one embodiment relates to identifying a reader mode of web content for presenting an article in a browser.

BACKGROUND

With the fast advance of browser technologies and World Wide Web infrastructures, more and more content or applications are accessed via a browser. However, most web documents are designed to carry a variety of content elements for multiple purposes. Often times, a user interested in a portion of content or an interactive application can be presented with myriads of information of no interest to the user at all. It is not unusual for a browser user to be distracted by navigation controls, user interface controls of a web document, advertising, marketing, or promotional campaign from a web document while trying to focus only on the interested portion of content.

Additionally, an article may be hyperlinked and buried in multiple web documents intentionally designed to increase both space and time to expose as much irrelevant information as possible to a user. Thus, in addition to making an effort to locate where an article is on a presentation layout of a web page, the user has to perform user interface actions to request and wait for other portions of the article. As a result, accessing content such as articles embedded inside web pages via a browser can often lead to intermittent and frustrating user experience.

Furthermore, a browser commonly provides a progress indicator to give a user some indication as to the progress of downloading a web page. However, most progress indicators are based on network connection activities and ignorant of actual content being downloaded. As a result, such indicators may keep the user waiting for a network connection to complete even when those content interesting to the user in the web page may already been downloaded and available in the browser.

Therefore, accessing content included in web documents via traditional browsers do not provide users with smooth, focused and friendly experiences.

SUMMARY OF THE DESCRIPTION

An embodiment of the present invention can include methods and apparatuses that automatically detect availability of a reader mode for article content in a web page addressed by a URL (Universal Resource Locator). Availability detection may be progressively performed such that operations that require fewer processing operations or resources (which may be referred to as cheap operations) are performed first to reduce the need to perform more expensive ones that require more processing operations or resources. A retrieval status of the web page may be detected to determine when enough content has been retrieved to initiate a detection of the reader mode for the web page. A reader indicator may be presented in a user interface of a browser if the availability of the reader mode is detected after performing availability detection. A user of the browser may be alerted to an alternative presentation of the article content from the web page by the reader indicator in addition to a presentation of the whole web page by the browser. If the reader mode of the web page is not available (as determined by the availability detection process), no reader indicator may be present in the browser.

In another embodiment, in response to user activation via a reader indicator indicating availability of an article in a web page loaded in a browser, the portion of the article's content (or article content) included in the web page may be extracted from content downloaded. Multiple pages of the article's content may be included in multiple hyperlinked web pages. A second web page having the next page of the article content may be identified by a next page link in the web page. Automatically in the background without an initiation from the user of the browser, the second web page may be preloaded for extracting the second page of the article's content. Both the current page and the next page of the article's content may be presented in the reader mode as one article within one window that can be scrolled up or down to allow all of the pages of the article to be visible. When the user scrolls towards the second page of the article content in the reader mode, a third web page having a third page of the article content may be automatically preloaded (if it was not already preloaded) for extracting the third page of the article content. As a result, the article content can be presented in the same window in the reader mode as if all pages of the article's content are available to the user. In some embodiments, all hyperlinked pages of the web page for the article content may be downloaded automatically on activation of the reader indicator. Alternatively, the hyperlinked pages may be retrieved in the background one by one in sequence. For example, the next web page hyperlinked for the next page of the article content may be downloaded as the current page of the article content is being presented (i.e. visible) in the reader mode.

In another embodiment, a stall of progress to download additional portion of a web page addressed by a resource address registered by a user of a browser may be detected. In response to the detection, whether a majority of usable content of the web page has been retrieved may be determined. An indication may be provided to the user to indicate readiness of the web page in the browser if the majority of usable content has already been loaded in a viewing area of the browser and is available to the user. Thus, the user's attention can be directed to the content viewing area to proceed interacting with the browser without a need for the user to wait for a remaining portion of the web page.

In yet another embodiment, a user selectable button that allows the user to stop loading of a web page maybe displayed in response to user input for loading a web page in a browser. During the loading of the web page, whether at least some of the usable content but less than all of the usable content of the web page has been displayed may be determined. A first visual state of the user selectable button may be displayed if it is determined that some of the usable content has been displayed to indicate a progress of receiving additional portion of the usable content of the web page. Whether a majority of the usable content of the web page has been displayed may be determined when detecting that the progress is stalled for receiving the additional portion of the usable content of the web page. In response, a second visual state of the user selectable button may be displayed to direct a user's attention to the usable content displayed without waiting for a remaining portion of the web page.

Other features of the present invention will be apparent from the accompanying drawings and from the detailed description that follows.

BRIEF DESCRIPTION OF THE DRAWINGS

The present invention is illustrated by way of example and not limitation in the figures of the accompanying drawings, in which like references indicate similar elements and in which:

FIGS. 3A-3C are sample diagrams illustrating exemplary DOM structures for a reader mode;

FIG. 4 is a flow diagram illustrating one embodiment of a process to indicate availability of a reader mode for web content;

FIG. 6 is a flow diagram illustrating one embodiment of a process to identify an article from web content in a reader mode;

DETAIL DESCRIPTION

Figure 1:
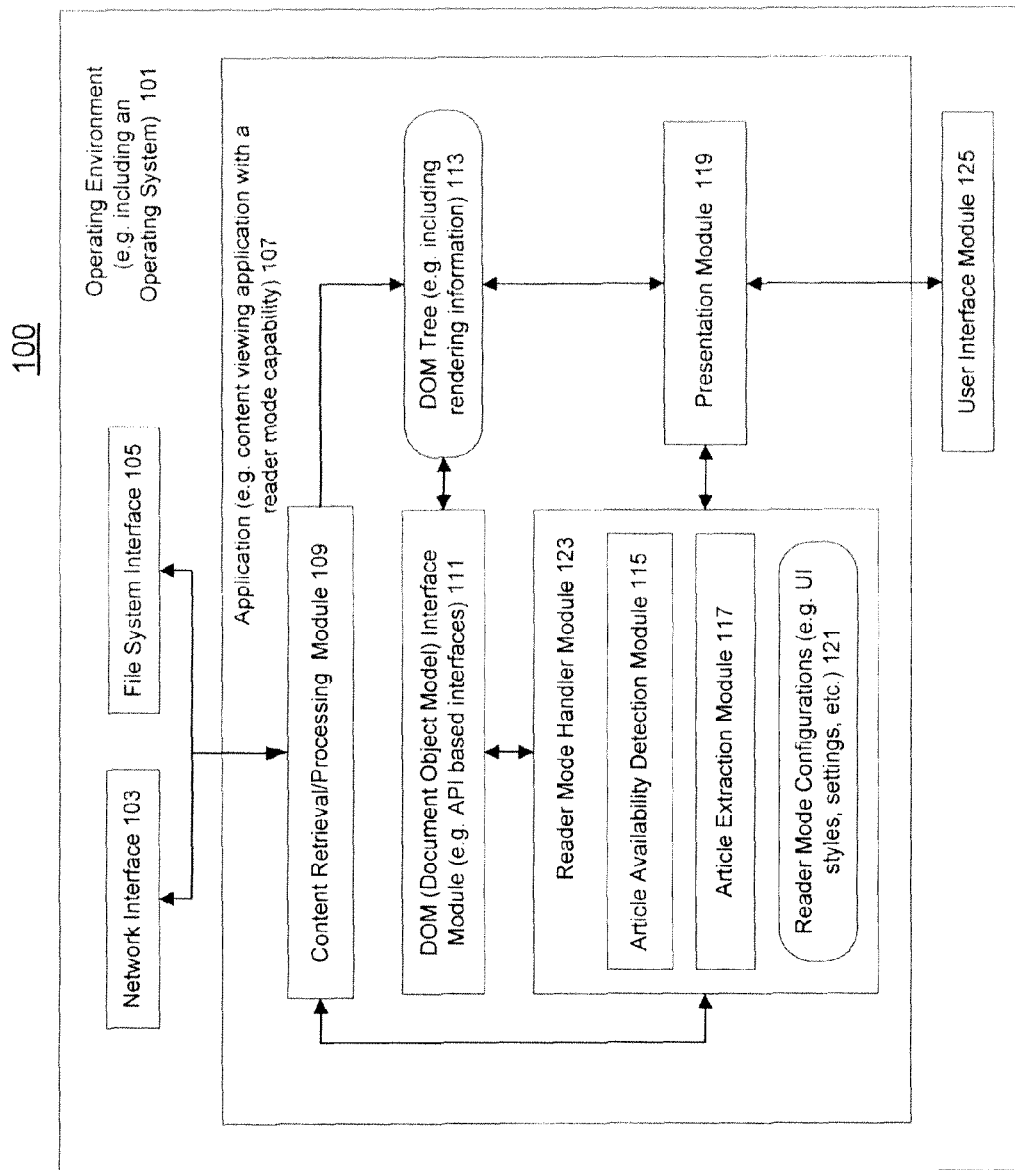
FIG. 1 is a block diagram illustrating one embodiment of a system for presenting web content in a reader mode.

Methods and apparatuses for presenting web content in a reader mode are described herein. In the following description, numerous specific details are set forth to provide thorough explanation of embodiments of the present invention. It will be apparent, however, to one skilled in the art, that embodiments of the present invention may be practiced without these specific details. In other instances, well-known components, structures, and techniques have not been shown in detail in order not to obscure the understanding of this description.

Reference in the specification to "one embodiment" or "an embodiment" means that a particular feature, structure, or characteristic described in connection with the embodiment can be included in at least one embodiment of the invention. The appearances of the phrase "in one embodiment" in various places in the specification do not necessarily all refer to the same embodiment.

The processes depicted in the figures that follow, are performed by processing logic that comprises hardware (e.g., circuitry, dedicated logic, etc.), software (such as is run on a general-purpose computer system or a dedicated machine), or a combination of both. Although the processes are described below in terms of some sequential operations, it should be appreciated that some of the operations described may be performed in different order. Moreover, some operations may be performed in parallel rather than sequentially.

In one embodiment, a reader mode for an article can be identified from content received (e.g. web content as a hypertext document received at a browser) to allow a user to access essential elements (e.g. hypertext elements) in the content, such as texts or other elements e.g. an image, a table, etc.), relevant to the article without being distracted by elements irrelevant to the article, or non-essential elements in the content. The reader mode may not be detected for content which does not contain an article, such as content for generic multimedia gallery or for multiple small comment paragraphs (e.g. a Google News web page). A preconfigured interface style independent of the article or the content may be imposed for the reader mode to present an article extracted from the content in a user appealing manner, such as via a simple scrollable text column in one font.

A content viewing application, such as a browser, may provide a reader mode capability by progressively detecting whether the reader mode is available for the content (or web content) received and activating the reader mode (e.g. on demand as requested by a user). For example, operations progressively demanding more and more computing resources may be performed in sequence to determine unavailability of the reader mode. No further operations related to the reader mode on the content may be needed if unavailability of the reader mode is determined. The reader mode may be ascertained (or detected) when no operations performed on the content, e.g. according to a set of preconfigured rules, indicate unavailability of the reader mode. Thus, cheap operations (i.e. less resource demanding) may be performed prior to expensive operations (i.e. more resource demanding) for conserving overall computing resources with minimum impact on the performance of the content viewing application. Expensive operations may not need to be performed for the content which does not include articles to be presented in the reader mode. In some embodiments, when a set of rules or heuristics are applied, a sequence (or order) may be imposed such that processing resources required are progressively increasing according to the sequence.

Furthermore, detecting availability of a reader mode and activating the reader mode may be separated to provide a user selectable option. Typically, detection of the reader mode may be performed automatically on received content transparent to a user. Subsequently, if the reader mode is available, the user may be allowed to cause activation of the reader mode with a user selectable option (e.g. via a user interface item). As a result, computing resources for activating the reader mode, which may be more resource demanding than detecting the availability, can be saved if the user does not select the reader mode.

In one embodiment, heuristic rules or decisions may be employed to determine if web content can be redacted to produce a reader mode based on topology and or geometric attributes (e.g. layout parameters) of a rendered DOM (document object model) tree representing the web content. For example, heuristic decisions may include deciding an article DOM node in the DOM tree to represent an article. Elements of an article DOM tree (e.g. rooted at the article DOM node) may be heuristically pruned to remove elements not relevant to the article, such as elements for advertisements or navigation side bars in a web page. Further, the article DOM tree may be augmented with additional elements, such as a title of the article, preloaded article pages hyperlinked in the web content, and/or an applicable pre-pending paragraph of the article, etc. Additionally, style elements for imposing a uniform user interface style across different articles may be applied to the article DOM tree for presentation in the reader mode. A DOM tree may be laid out its elements' geometric attributes or parameters without being presented on a display screen.

In one embodiment, presenting an article in a reader mode may include smooth scrolling for enhancing article reading experiences. For example, target scrolling positions may be determined automatically when responding to scrolling requests from a user (e.g. via a scroll bar). In one embodiment, visual positions of text structures, such as words, lines, paragraphs, etc. may be considered to identify the target scrolling positions to ensure words presented in a reader mode would not be cut off in the middle on the screen as pages scroll. Thus, each line of text present on a display window on the screen at the target scrolling position may be completely visible.

In some embodiments, email or other messaging capabilities may be provided to allow a user to send out an article presented in a reader mode directly. For example, a message may be automatically generated to include a hypertext document (e.g. an HTML page formatted according to the reader mode) corresponding to an article DOM tree representing an article presented in the reader mode. Optionally, the message may include a title based on a title of the article. Elements from original content for the article but not relevant to the article may not be included in the message. Multiple pages for the article hyperlinked to the original content may be pre-loaded to be included in the message, even before the user actually views the texts in the hyperlinked pages in the reader mode.

FIG. 1 is a block diagram illustrating one embodiment of a system 100, such as in a data processing system or, a computer, for presenting web content in a reader mode. System 101 can be a computer operating environment including an operating system and/or an application 107, such as a content viewing application with a reader mode capability, to present the web content in the reader mode. Application 107 may be a browser capable of detecting availability of an article from web content received and providing an option to present the article in a reader mode to a user.

Content retrieval/processing module 109 may retrieve a document or content from a network via a network interface 103 (e.g. from a remote web server) or a file system locally or remotely coupled via file system interface 105. In one embodiment, the content received may be a hypertext based document encoded in languages such as HTML (Hyper Text Markup Language), XML (Extensible Markup Language), or other markup languages, etc.

Content retrieval/processing module 109 can process (e.g. parse) a document to identify document elements and generate or build a DOM tree or DOM structure 113 out of the document elements. A document element may be a hypertext element such as an HTML tag in an HTML document. In one embodiment, DOM tree 113 may represent a topological or structural relationship among the document elements. Each node in DOM tree 113 of a document may correspond to one document element of the document. Document elements may include document content and/or layout specifications, such as size attributes associated with HTML tags in an HTML document, for presenting the document content, e.g. via presentation module 119 to display a user interface rendering a web page on a display screen via user interface module 125.

In one embodiment, content retrieval/processing module 109 may include a rendering engine to generate rendering information, such as layout parameters (e.g. sizing data of a rectangular area) for each node in DOM tree 113 for presenting a corresponding document. The rendering engine can make rendering decisions according to configurations including layout specifications in a document, user interface settings for application 107 and/or other system settings, etc. A rendered DOM tree may represent web content such as a web page presented by a browser.

In one embodiment, application 107 may include reader mode handler module 123 to perform progressive operations to enable a reader mode for presenting an article from DOM tree 113. Reader mode handler module 123 may include article availability detection module 115 to determine if an article is available from a document corresponding to DOM tree 113, e.g. identifying an article DOM node in DOM tree 113. For example, content retrieval/processing module 109 may detect a sufficient amount of content has been retrieved for a document addressed by a resource address (e.g. a URL) to cause availability detection module 115 to detect whether a reader mode is available for the document. Thus, the availability of the reader mode for the document may be detected prior to the arrival of complete resources associated with the document, such as frames, images, and/or other media resources linked in the document. In one embodiment, reader mode handler module 123 may access DOM tree 113 via DOM interface module 111. For example, DOM interface module 111 may be standard based according to JavaScript specifications for web browsers. A JavaScript context for reader mode handler module 123 may be hidden from other components of application 107, such as content retrieval/processing module 109.

In one embodiment, if a reader mode is detected for a document, presentation module 119 may present a reader mode indicator as a user interface item for application 107, such as in an address bar of a browser. The reader mode indicator may be presented while content retrieval/processing module 109 continues retrieving additional portions of the document. The reader mode indicator may allow a user to instruct application 107 to present an article extracted from the document in the reader mode. In one embodiment, article extraction module 117 may build an article DOM tree for the reader mode in response to a user instruction (e.g. via the reader mode indicator) based on an article DOM node identified by article availability detection module 115. Reader mode handler module 123 may include reader mode configurations 121 for updating the article DOM tree with common user interface style for reader mode presentation. For example, user interface styles configured in reader mode configurations 121 may include font size, display window size, font type, line spaces, etc. for presenting text data. A user may pre-configure settings in reader mode configurations 121 to allow a uniform and common presentation style for different articles from different web content. In some embodiments, presentation module 119 may present a complete document according to DOM tree 113, such as based on a standard web page presentation by a browser, as a darkened background while presenting an article extracted from the document in a reader mode on top of the background.

Figures 2A, 2B:
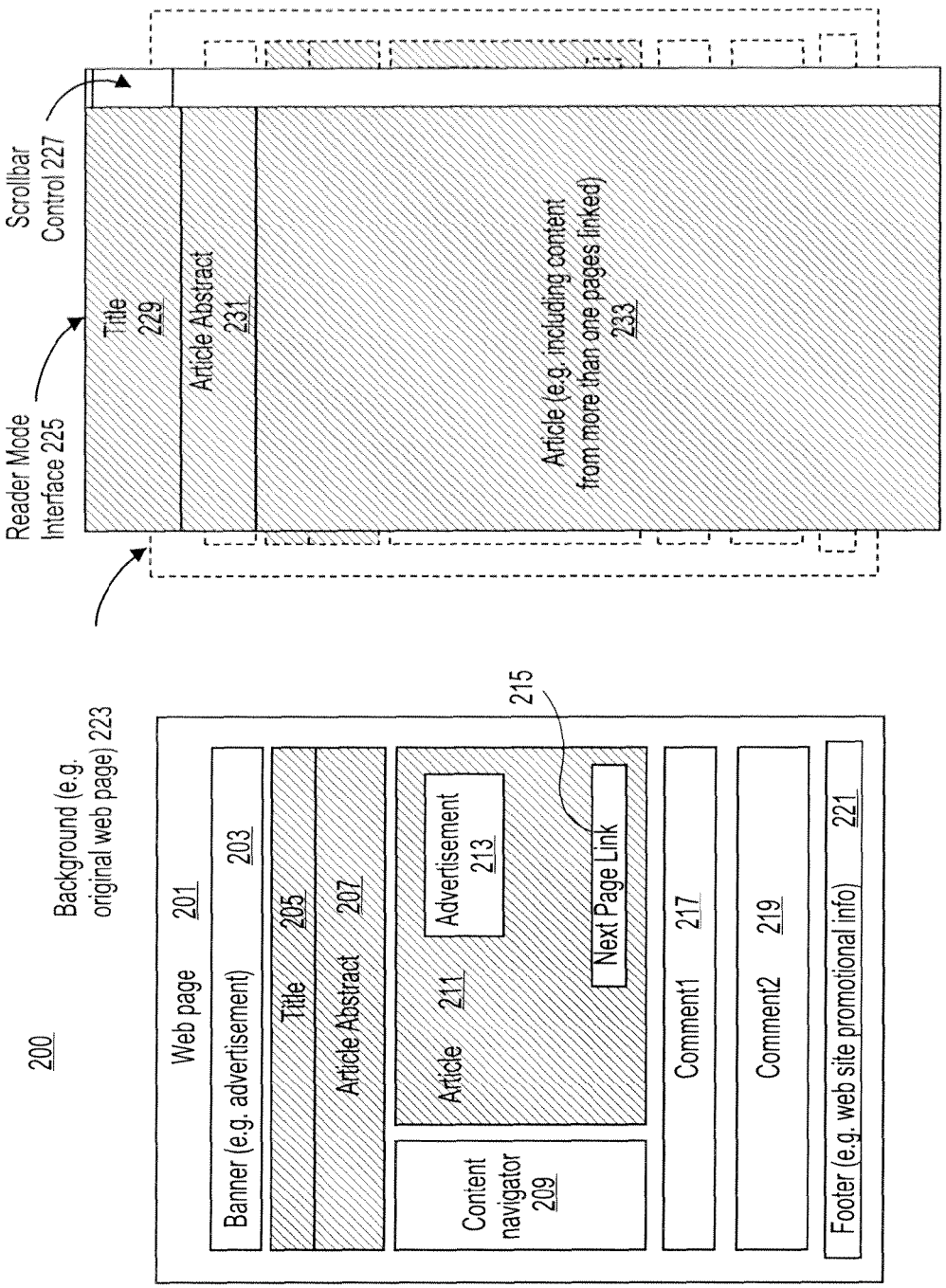
FIGS. 2A-2B are sample diagrams illustrating examples of user interface configurations for presenting web content in a reader mode.

FIGS. 2A-2B are sample diagrams illustrating examples of user interface configurations for presenting web content in a reader mode. For example, diagram 200 may be presented according to some components of system 100 of FIG. 1. In one embodiment, web page 201 in FIG. 2A may represent a hypertext document or web content rendered by a content viewing application, such as a browser. Web page 201 may include banner 203 displaying, for example, advertisement content. Content navigator 209 may be configured to navigate content hosted together with the hypertext document, e.g. in a web site from a remote web server. Web page 201 may include footer 221, for example, to promote a web site.

In one embodiment, web page 201 may present an article having main article content in article 211, a title 205 and an article abstract 207. Article 211 may include advertisement 213 not related to the article and next page link 215 for linking to other pages of the article. Web page 201 may include independent paragraphs of texts such as comment1 217 and comment2 219 which may be based on comments from viewers of the article. A reader mode may be determined according to article 211 in web page 201.

FIG. 2B may illustrate the presentation of an article identified from web page 201 in a reader mode. In one embodiment, reader mode interface 225 may be configured for presenting an article extracted from a web page in a reader mode without presenting elements irrelevant to the article. For example, reader mode interface 225 may include a title 229 identified from title 205 of FIG. 2A, an article abstract 231 identified from article abstract 207 of FIG. 2A, and the main content article 233 extracted from article 211 of FIG. 2A. Article 233 may include preloaded content via next page links, such as next page link 215 of FIG. 2A. Thus, article 233 may include content not present in article 211 of FIG. 2A. Elements in the original web page, such as web page 201 of FIG. 2A, but irrelevant to article 233 may be excluded from reader mode 225, such as banner 203, advertisement 213, comment1 217, etc. of FIG. 2A.

Reader mode interface 225 may be based on a single column of display window including scrollbar control 227 to allow a use to view different portions of texts in article 233 within a window area of reader mode 225. In some embodiments, scrollbar control 227 may cause preloading of one or more hyperlinked pages for article 233 prior to scrollbar control 227 moving to scrolling positions corresponding to content of the hyperlinked pages. In some embodiments, reader mode 225 may present an article extracted from an original web page on top of presentation of the original web page as a background, such as original web page 223 for web page 201 of FIG. 2A. Original web page 223 as a background may be darkened, blurred, or processed for other visual effects based on the presentation of the original web page, such as web page 201 of FIG. 2A. Interface 225 may include page number identifiers (e.g. "page 1" or "page 1/4") to indicate different portion/page of an article, for example, corresponding to different hyperlinked web pages. The total number of pages may be included in the page number identifiers, such as in "page 1/4".

FIGS. 3A-3C are sample diagrams illustrating exemplary DOM structures for a reader mode. For example, diagram 300 may be presented according to some components of system 100 of FIG. 1. In one embodiment, diagram 319 may illustrate rendering data associated with a portion of a rendered DOM tree 321 rooted at node 301 representing a web page inside a content viewing application, such as a browser, for a hypertext document. Each node in tree 321 may correspond to an area in diagram 319. A reader mode may be identified in the hypertext document with node 305 selected to identify an article. Node 309 may include significant text content for the article. Node 311 may be irrelevant to an article, e.g. an advertisement section. Node 305 may have an offspring node 313 representing a hyperlink to access documents including other portions of the article.

Turning now to FIG. 3B, tree 323 may correspond to an article node 305 (e.g. corresponding to an article element of a web page) identified from tree 321 of FIG. 3A. Tree 323 may include article content extracted from identified article node 305, e.g. by copying nodes 305, 309 and 313 while excluding node 311 of FIG. 3A as nodes 305b, 309b and 313b. Turning now to FIG. 3C, tree 324 may represent an article rendered in a reader mode. For example, tree 324 may be based on tree 323 of FIG. 3B with addition nodes 315 and 317. Node 315 may correspond to a common user interface style imposed for presenting an article in a reader mode. Node 317 may be inserted to tree 324 for preloaded content following next page links, such as in node 313b of FIG. 3B.

FIG. 4 is a flow diagram illustrating one embodiment of a process to indicate availability of a reader mode for web content. Exemplary process 400 may be performed by a processing logic that may comprise hardware (circuitry, dedicated logic, etc.), software (such as is run on a dedicated machine), or a combination of both. For example, process 400 may be performed by some components of system 100 of FIG. 1. In one embodiment, at block 401, the processing logic of process 400 can determine a status of content retrieval for a web page addressed by a URL. The processing logic of process 400 may receive the URL from a user and access the URL for retrieving content of the web page. When a portion of the content is available, the processing logic of process 400 may begin rendering the available content during the content retrieval. In one embodiment, the processing logic of process 400 may monitor the status during the content retrieval (e.g. periodically). The status may indicate whether to initiate a detection of a reader mode of the web page. The processing logic of process 400 may retrieve the web page from a locally or remotely coupled file system or network coupled servers according to the URL.

In one embodiment, a status of content retrieval from a URL of a web page may indicate readiness to initiate a detection of a reader mode for the web page if a sufficient portion of content has already been retrieved for the web page. A sufficient portion of the content for the web page may be based on whether a visually non-empty layout of a content viewing area in a browser browsing the URL for the web page has been generated and/or if a main frame of the web page has been received. A main frame of a web page may be a hypertext document directly addressed by the URL of the web page. A hypertext document may include raw content data and/or layout specifications for presenting the content included in a standard browser, such as Internet Explorer® from Microsoft Corporation or Safari® from Apple Inc. Examples of visually non-empty layouts are described in patent application Ser. No. 12/419,577 which is hereby incorporated by reference herein.

If a status to initiate detection of a reader mode for a web page is determined, at block 403, the processing logic of process 400 may progressively (e.g. with respect to required processing resources) detect availability of a reader mode for article content from the web page according to content already received for the web page. In one embodiment, the operations may be performed on a DOM structure built from retrieved content in a content viewing application. The processing logic of process 400 may perform cheaper operations (e.g. in terms processor cycles and/or memory space requirement) before more expensive operations to disqualify the availability of the reader mode for the web page.

If availability of article content (or a reader mode) from a web page is detected, at block 405, the processing logic of process 400 may present a reader indicator in a user interface of a content viewing application, e.g. a browser. The reader indicator may be a user interface item, such as a button, to indicate availability of an alternative presentation of the article content extracted from the web page in addition to a default presentation of the web page by the content viewing application. In one embodiment, the alternative presentation of the article's content is generated (if not already generated) and then presented (e.g. presented by displaying the article's content) in response to receiving an input (e.g. a click or a touch) to the user interface item that is the reader indicator. The default presentation of the web page may correspond to a rendered DOM structure built directly from all content retrieved for the web page. If the availability of the article content is not detected, the reader indicator may be absent from the user interface of the content viewing application. Thus, a user may not be allowed to activate a reader mode presentation on a web page for which the availability of article content is not detected. In some embodiments, presentation of visually non-empty content may precede presentation of the reader indicator. Availability detection for the reader indicator may start after certain delay (e.g. 100 ms) subsequent to the presentation of visually non-empty content.

Figure 5:
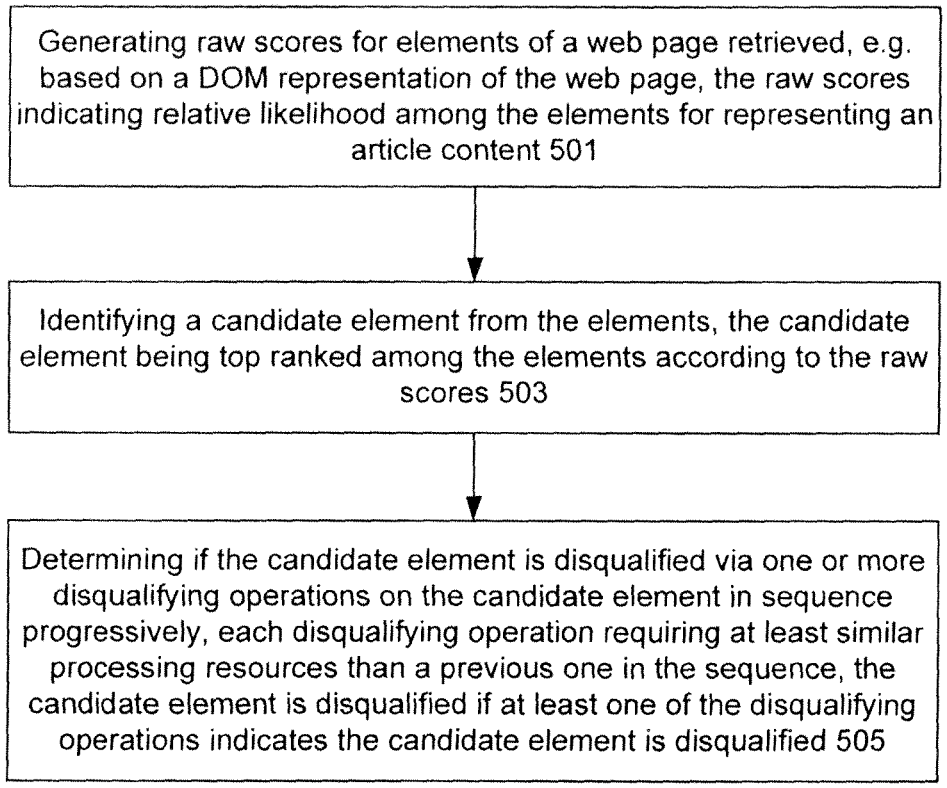
FIG. 5 is a flow diagram illustrating one embodiment of a process to heuristically detect availability of a reader mode for web content.

FIG. 5 is a flow diagram illustrating one embodiment of a process to heuristically detect availability of a reader mode for web content. Exemplary process 500 may be performed by a processing logic that may comprise hardware (circuitry, dedicated logic, etc.), software (such as is run on a dedicated machine), or a combination of both. In one embodiment, process 500 may be performed as part of process 400 including operations related to block 403 of FIG. 4. At block 501, the processing logic of process 500 can generate raw scores (or text scores) for elements of a web page retrieved for detecting availability of a reader mode for the web page. An element of the web page may be a hypertext element in a hypertext document retrieved for the web page. In one embodiment, an element of a web page may correspond to a node in a DOM structure rendered according to content received for the web page. The raw scores generated or assigned for the elements or DOM nodes may indicate a level of likelihood or relative likelihood (e.g. the higher the raw score, the more the likelihood) among the elements for representing article content for a reader mode of the web page. The processing logic of process 500 may traverse the DOM structure to determine a raw score for each node of the DOM structure, e.g. based on a size of text data associated with the node.

In one embodiment, heuristic considerations may be applied in sizing text data for a DOM node, such as based on character counts. In one embodiment, each unit of text data (e.g. a character) may be directly associated with no more than one node in a DOM structure representing a web page. Exemplary heuristics may include selecting text data within a depth distance in a DOM tree rooted at the DOM node. The depth distance employed may depend on a type of element associated with the DOM node for avoiding erroneously assigning higher raw score for nodes at higher levels of the DOM tree and/or to prevent scoring nodes for highly repeated, large and/or nested (within the DOM tree) text data, etc. For example, usable text nodes (or nodes directly associated with text data) under the DOM node may be considered within a shallow depth distance (e.g. two levels of depth) including children text nodes and grandchildren text nodes. Great great children text nodes or text nodes of a deeper depth may be considered for list, span or presentational elements, e.g. based on HTML tags <ol>, <ul>, <span>, <font> or other presentational tags. Typically, text nodes with longer text data might score higher than text nodes with shorter text data. Thus, those text nodes with longer text data might be collected while those text nodes with shorter text data or no text data might be ignored for article content identification.

in some embodiments, a language multiplier may be applied to adjust a score for a DOM node. The language multiplier might be used to compensate for languages, such as Asian languages, which tend to exhibit shorter articles (i.e. less characters may be required per word/sentence to express similar ideas compared with articles in other languages). Adjustment of a raw score for a DOM node might be based on a power (e.g. a mathematical operator, exponent) of the score to a language power multiplier. Different language multipliers may be assigned for different languages. For example, a multiplier for the Chinese language might be 3. A power multiplier for the Chinese language might be 1.25. The English language might not be adjusted with a language multiplier of 1. The language (e.g. English, Chinese, Japanese . . . ) for text data associated with a DOM node might be detected based on an encoding scheme identified from first few characters of the text data.

Optionally, a raw score of a DOM node may be adjusted according to attributes (e.g. HTML tag attributes) associated with the DOM node. For example, the raw score may be increased if the attributes explicitly include certain key words, such as "article", "content", etc. to indicate the presence of article content. Alternatively, the raw score may be reduced if the attributes explicitly include key words that indicate non article content, such as "advertisement", "comment", etc. As a result, text data belonging to viewer comments, for example, may be filtered with lower scores. At block 503, the processing logic of process 500 may identify a candidate (or a candidate element) for an article node in a web page as the DOM node with the highest adjusted score in the DOM tree corresponding to the web page (i.e. top ranked element among hypertext elements in the web page).

At block 505, the processing logic of process 500 may determine if a candidate element is disqualified for an article node in a web page. The processing logic of process 500 may perform one or more disqualifying operations on the candidate element in sequence progressively. Each disqualifying operation may require similar or more processing resources than a previous one in the sequence. The candidate element may be disqualified if at least one of the disqualifying operations on the candidate element indicates the candidate element is disqualified. Thus, required computing resources might be minimized to disqualify a reader mode for a web page.

In one embodiment, the processing logic of process 500 may apply a set of heuristic rules progressively to determine if the candidate element is disqualified. Each heuristic rule may be associated with a disqualifying condition or constraint based on characteristics derived from the candidate element in a DOM structure. For example, if one of the disqualifying conditions is applicable, the candidate element may be disqualified. In one embodiment, a condition is applicable if it is evaluated to be true. Alternatively, a condition may be configured to be applicable if evaluated to be false.

In one embodiment, heuristic rules to disqualify a candidate element may be associated with characteristics of a DOM structure corresponding to the candidate element. For example, the characteristics of the DOM structure may include a raw score or text score (e.g. adjusted) assigned to the candidate element, a score density, a number of horizontal rule elements, a number of heading elements, and/or the number of DOM nodes having similar structures (i.e. similar to the DOM structure) within the web page, etc. For example, the candidate element may be disqualified if the raw score assigned is not higher than a threshold number (e.g. preconfigured minimum score). The minimum score may indicate a required size of text data for the presence of article content in a web page.

In one embodiment, a score density may be related to a raw score divided by a size of geometric area rendered for a DOM structure, such as height times width of the two dimensional space allocated to display content of the DOM structure. In one embodiment, if a candidate element has a raw score higher than a minimum score, the candidate element may be disqualified as an article node if a score density associated with the candidate element is lower (or smaller) than a minimum score density (e.g. preconfigured).

In another embodiment, the number of horizontal rules in a DOM structure of a candidate element may correspond to a count of the number of horizontal rule elements (e.g. based on HTML tag <hr>) inside the DOM structure. A horizontal rule element may indicate a partition explicitly specified among text data, e.g. between two blocks of characters not belonging to one single article. Optionally, a width of a horizontal rule element may be considered for counting the number of horizontal rule elements. For example, a horizontal rule element may not be counted if it is rendered with a width smaller than a certain percentage (e.g. configured as 70%) of the width rendered for the DOM structure. Typically, the presence of a high number of horizontal rule elements may indicate unrelated or semi related portions of text data. In one embodiment, if a candidate element has a score density higher than a minimum score density, the candidate element may be disqualified as an article node if the number of horizontal rule elements associated with the candidate element is higher than a maximum number of horizontal rule elements allowed or preconfigured for the article node.

In one embodiment, the number of headers in a DOM structure of a candidate element may correspond to a count of the number of heading elements (e.g. based on HTML tags, such as <h1>, <h2>, etc.) inside the DOM structure. The presence of a high number of heading elements may indicate unrelated or semi related portions of text data. In one embodiment, a sequence order may be enforced to consider the number of heading elements and the number of horizontal rules in applying the heuristic rules. For example, a candidate element may be disqualified as an article node based on the number of heading elements (e.g. with a number of heading elements larger than a maximum number of heading elements allowed) only when it is not disqualified based on the number of horizontal rules (e.g. with a number of horizontal rules smaller than a maximum number of horizontal rules allowed). In some cases, the total area used for the density calculation may be adjusted to exclude non-text elements (such as images). For example, text-less areas occupied by large in-line images in an article may be excluded from being counted or considered against overall score density.

In some embodiments, a candidate element associated with a DOM structure may be disqualified as an article node for a web page if the number of elements similar to the candidate element (or similar elements) in the web page exceeds a maximum number (e.g. preconfigured). A similar element may have a DOM structure similar to in the DOM structure of the candidate element. Similarity between two DOM structures (or DOM nodes) may be measured according to, for example, comparisons of class names, a scores assigned, visibility rendered in the web page, geometric properties rendered (e.g. width, height, area size), topological relations among sub trees of DOM nodes inside the DOM structures, names of parent nodes, and/or node types, etc. In some embodiments, similarity between separate DOM structures corresponding to separate elements may depend on special DOM nodes commonly present in the DOM structures compared, such as title color, separation lines, class names, button elements, image elements, heading elements, etc. Typically, similar elements do not have parent/child relationship in a DOM structure representing the web page. Elements corresponding to user comments included in a web page may be associated with DOM structures similar to each other. Alternatively, elements corresponding to different posts on a blog and/or multiple separate articles includes in one single web page may be associated with DOM structures similar to each other. In one embodiment, the candidate element may be disqualified according to the number of similar elements only if the candidate element is not disqualified according to a number of heading elements associated with the candidate element.

FIG. 6 is a flow diagram illustrating one embodiment of a process to identify an article from web content in a reader mode. Exemplary process 600 may be performed by a processing logic that may comprise hardware (circuitry, dedicated logic, etc.), software (such as is run on a dedicated machine), or a combination of both. For example, process 600 may be performed by some components of system 100 of FIG. 1. At block 601, the processing logic of process 600 can identify a title of article content associated with an article element or article node of a web page. For example, the processing logic of process 600 may respond to user activation via an indicator presented to indicate availability of the article content in the web page. The availability of the article content may be based on identification of the article element from the web page.

In one embodiment, an entire web page corresponding to a DOM structure may be searched for determining a title for an article represented by an article node or an article element of the DOM structure. An article frame of the article element may be determined based on the geometric area rendered in the web page for the article node. If the web page includes a sizable image (e.g. according to a threshold size) placed right above the geometric area rendered for the article node, the article frame may be expanded to include the image.

In one embodiment, possible title elements may be identified from an entire document for a web page. For example, possible title elements may include heading elements (e.g. based on HTML tags <h1>, <h2> . . . ), elements associated with a class name explicitly specifying certain title related keywords, such as "headline", "title", "article title", or other applicable keywords. A visual distance may be determined for each possible title element as the distance between the center of a geometric area rendered for the possible title element and the top center of a geometric area rendered for an article element. Heuristic rules may be applied on the possible title elements to select qualified title elements. In one embodiment, a title score may be assigned for each qualified title element for deciding a title according to a ranking using title scores.

In one embodiment, heuristic rules for selecting qualified title elements may include conditions evaluated on possible title elements. A possible title element may be disqualified if one of the conditions evaluated to be true. For example, a possible title element may be disqualified if one or more of the following conditions apply:
  if a visual distance to the article element is greater than a threshold (e.g. 500 pixels as configured);
  if the width of an area rendered for the possible title element is too narrow, e.g. less than a certain ratio (e.g. 50% as configured) compared with the width of an article area rendered for an article element;
  if the horizontal center of the area is outside the horizontal space of the article area;
  if a font size of the possible title element is less than a configured minimum title font size;
  if a size of text data (or text length) in the possible title element is less than a certain preconfigured number.

In other words, each condition may correspond to a qualifying constraint. The possible title element may satisfy these qualifying constraints. If no possible title elements are selected (i.e. all disqualified), a page title of the web page (e.g. based on HTML tag <title> or other presentational settings) may be selected as a title for the article content.

In one embodiment, a title score may be heuristically calculated for each qualified possible title element based on a distance (e.g. a visual distance) between the qualified possible title element and an article element. The distance may be reversely related to the title score, e.g. the longer the distance, the lower the title score. Further, in some embodiments, title score multipliers may be applied to adjusting (e.g. increasing/decreasing) assigned title scores for incorporating additional heuristic considerations in selecting a title element. The additional heuristic considerations may include, for example: increasing a title score for a qualified possible title element of a deeper DOM depth; increasing a title score for a qualified possible title element with a larger font size; increasing a title score for a qualified possible title element with attributes (e.g. based on ID or class attributes) matching (e.g. according to regular expression operations for string matching) certain keywords, such as "title", "headline", etc. In one embodiment, the DOM depth may correspond to a depth level of a DOM tree representing an entire web page.

At block 603, the processing logic of process 600 may optionally identify a link (e.g. a hypertext link to a URL) in a web page for a subsequent portion of article content of the web page. For example, the link may be based on an anchor element indicating where (e.g. with a URL) to locate a next page of the article content. The processing logic of process 600 may select possible next page elements from the web page to assign next page scores for the possible next page elements collected. The link may be identified based on the top ranked possible next page element.

In one embodiment, possible next page elements may be anchor elements located within a visual area or geometric area surrounding an article element representing article content in a web page. For example, the visual area may be based on an ancestor node of an article node corresponding to the article element. The ancestor node may be the closest ancestor node (e.g. with respect to the article node in DOM distance) rendered in a bigger (or no less) area than the area for the article element. The visual area may be an expanded area from the area (or rendering area) for the ancestor node by a certain parameter (e.g. configured numbers), e.g. 100 pixels underneath the article element. Thus, the visual area may encompass the area for the article element or a visually larger ancestor of the article element. Typically, the visual area is smaller than a display area rendered for the web page. Heuristic considerations or rules may be applied to disqualify an anchor element as a possible next page element. For example, an anchor element may be disqualified if it is not visible in a web page; if it links to the same web page; or if it is located (rendered) outside the identified area surrounding the article element, etc.

In another embodiment, a reference path associated with an anchor element to specify a link URL (e.g. based on attribute "href") may be inspected to identify a next page element. A reference path may be a string including one or more path components. The reference path may be compared with an article URL (e.g. the URL for a web page including article content) for detecting a next page element. For example, the anchor element may be disqualified as a next page element if the number of path components in the reference path is less than the number of path components in the article URL; if numbers of path components between the reference path and the article URL differ significantly (e.g. by a threshold number preconfigured); or if there is a mismatch of path components with the article URL except for certain path components (e.g. the last two components), etc. In some embodiments, one or more path components may be selected from the reference path for measuring a difference (e.g. number of mismatched components) between the reference path and the article URL. A mismatch of a path component not selected may disqualify the reference path as a next page element.

Two path components in two different paths can match if both path components are similarly positioned in the corresponding paths and evaluated to be equal to each other (according to a string comparison). For example, "a/b/c" and "a/b/d" may include one mismatch of path components "c" and "d". To further illustrate, for an exemplary article URL "http://site.com/A", anchor elements with the following reference paths may be disqualified as next page elements: "http://newsite.com/A", "http://site.com/B", "http://site.com/a/b/c/d/e/f/g". Optionally, a number of mismatches of path components between the article URL and the reference path of the anchor element may be counted to indicate likelihood for the anchor element to be a next page element. Mismatch of a path component may be assigned a weight. The number of mismatches counted may be based on different weightings on the mismatches of different path components.

In one embodiment, presence of a possible next page number may be detected in an article URL and a reference path. For example, number strings may be extracted and compared for the last two path components of the article URL and the reference path. A number string specifying a possible page number may be considered in matching path components. In one embodiment, a path component including a possible page number in the reference path can match a corresponding path component in the article URL if the corresponding path component has another number with value smaller than the possible page number. To illustrated, an exemplary reference path of "http://site.com/a/b2346/page.html" can match an exemplary article URL of "http://site.com/a/b2345/page.html". Certain numbers, such as date or having a value over a limit (e.g. preconfigured) may not be considered as a possible page number. Typically, if no number strings are found in the article URL, a current page number may be assumed to be 1 for comparison purpose. A possible next page number extracted from the reference path may not be smaller than a number extracted from a corresponding path component of the article URL (e.g. resulting in mismatching of component paths). In some embodiments, a mismatch may be identified if a possible next page number is not properly related the current page number e.g. based on an increment of 1. For example, a candidate path with component "&page=3" may mismatch a current path with component "&page=1".

Query components (e.g. based on special characters such as "?", "&" and "=") may be separately compared between the reference URL and the article URL. For example, if there are more than two mismatches between query components of the reference URL and the article URL, the anchor element corresponding to the reference URL (e.g. a string path) may be disqualified as a possible next page element. To illustrate, an exemplary reference URL with query components "site.com/a/b?page=2" can match an exemplary article URL "http://site.com/a/b?page=&label=no".

According to one embodiment, each possible next page element may be assigned a next page score based on a number of mismatches counted compared with an article URL, and/or a vertical distance from an article element, e.g. based on a distance between top center points of bounding rectangles for rendering the possible next page element and an article element. In some embodiments, the next page score may be higher if a difference between the vertical distance and a maximum vertical distance allowed for the article element is smaller. The maximum vertical distance may be based on a height of a bounding rectangle or a visual area surrounding the article element. Thus, the next page score may represent a preference for elements closer to the bottom of the bounding rectangle of the article element. The next page score may be lower if the number of mismatches is larger. Further, in some embodiments, heuristic preferences may be applied for a possible next page element of certain characteristics. For example, the next page element may be provided with bonus scores if it is a list item element and/or if matches are identified between the next page element (e.g. based on its attribute values) and one or more key words (e.g. preconfigured) such as "page", "next", etc.

A next page element may be selected according to the highest next page score among the collection of possible next page elements. The next page element may not be identified if a reference path associated with the highest reference page score is invalid. In one embodiment, the reference path may be invalid if content retrieved from the reference path is invalid (e.g. without article content), empty, or associated with errors. The next page element may not be identified if each possible next page element is disqualified.

According to some embodiments, if a next page element identified in a first web page to retrieve a second web page is associated with a DOM path within the first web page (e.g. parent/child relationships following a root node in a DOM tree), the DOM path may be applied as a suggestion for locating a possible next page element in the second web page. A preference may be given to the possible next page element for retrieving a third web page. In one embodiment, the possible next page element may be identified as a link to the next page from the second web page if it is not disqualified without checking other possible next page elements in the second web page. Optionally, the possible next page element in the second web page may be identified as a default link to the next page if no other candidates for possible next page elements are found in the second web page. In some embodiments, similar techniques may be applicable to use the DOM path of an article node on one page as a suggestion for locating a possible article node on the next page without checking other possible article nodes.

At block 605, in one embodiment, the processing logic of process 600 may determine one or more separate elements of a web page representing consecutive portions of article content for an article element. For example, a separate element may represent a title portion, an abstract portion or a first paragraph of the article content as a pre-pending element outside the article element. A pre-pending element may include one or more paragraphs of the article content. Optionally, more than one pre-pending elements may be identified for the article content. For example, the article element and the pre-pending element may be rendered in non-overlapping geometric areas for the web page. Alternatively, DOM nodes corresponding to the article element and the pre-pending elements may not be related in a parent/child (or ancestor/offspring) relationship. The processing logic of process 600 may collect possible pre-pending elements rendered visually above (e.g. based on geometric relationships) the article element. Each possible pre-pending element may include text data selected in a similar manner as in detecting availability of the article element.

In one embodiment, a possible pre-pending element may be selected according to some heuristic rules. For example, the possible pre-pending element may be rendered with a height greater than a minimum height based on a minimum number of lines of text (e.g. 3 as configured). Alternatively, the possible pre-pending element may be rendered with a geometric dimension (e.g. height or width) not significantly different from (e.g. higher, shorter, narrower or wider, etc.) than a corresponding geometric dimension of the article element with certain margin (e.g. 10% as configured). Other heuristic conditions may apply. In some embodiments, a possible pre-pending element including only text data may be selected even if it is rendered with a geometric dimension (e.g. height) less than a minimum required threshold.

In one embodiment, pre-pending scores may be assigned to possible pre-pending elements in a similar manner to assigning raw scores in detecting availability of an article element in a web page. Optionally, pre-pending scores may depend on similarity measurements between the possible pre-pending elements and the article element. The similarity measurements may include comparing font sizes and/or font weights. A top ranked pre-pending element may be identified as a candidate pre-pending element according to the pre-pending scores.

In one embodiment, a number of heuristic rules may be applied to ensure a candidate element meet certain required conditions, including, for example, determining a score density, a horizontal rule density, a header density, etc. similar to operations in detecting an article element. The heuristic rules may disqualify the candidate pre-pending element. Optionally, a last text node in the candidate element may be compared with a first text node in the article element to ensure the candidate element does not include a title for the article element, e.g. based on whether they share a same font setting. If the candidate element is not disqualified, a pre-pending element may be identified by the candidate element.

At block 607, in one embodiment, the processing logic of process 600 may prune a DOM structure representing one or more elements collected to extract article content (e.g. based on text data) for presentation in a reader mode. The elements may include an article element and, optionally, a pre-pending element, of a web page. In one embodiment, the DOM structure may be built according to DOM nodes corresponding to the elements in the web page. The processing logic of process 600 may detect a title of the article content and/or identifying a next page element for the article content prior to pruning the DOM structure. In one embodiment, the processing logic of process 600 may traverse the DOM structure (or tree) top down recursively to perform node pruning (or filtering) and/or node selection to preserve text data of the article content while removing irrelevant DOM nodes.

The processing logic of process 600 may preserve readable elements. A readable element may include text data. Alternatively, a readable element may include images with sizes satisfying certain size constraints, e.g. based on configured minimum numbers of pixels in width, height or area. In one embodiment, DOM nodes belonging to a collection of types of elements (e.g. preconfigured) may be filtered from an article node. For example, the collection of types of elements to filter may include iframe elements, script elements, presentational elements, link elements, empty elements (e.g. elements including no text data), form elements and/or ordered list elements (e.g. based on tags such as <IFRAME>, <SCRIPT>, <STYLE>, <LINK>, <FORM>, <OL> . . . ), etc. Optionally, an element may be filtered based on associated attributes/properties, such as a definition of CSS (Cascading Style Sheet) float style.

The processing logic of process 600 may evaluate an element to preserve one or more attributes of the element which is filtered. For example, a font element may be filtered while font styles, such as "bold", "italic" specified inside the font element may be incorporated or tracked in a separate user interface style, such as in reader mode configuration 121 of FIG. 1, for article presentation in a reader mode. The processing logic of process 600 may detect specific attributes of an element to determine whether to filter the element. For example, an object element including attributes (e.g. application source) having certain strings, e.g. indicating plug-in applications for "YouTube®" or "Flash®" plug-in applications may be preserved. The processing logic of process 600 may perform regular expression operations to identify the presence of certain strings (e.g. configured). In some embodiments, a replacement element may be generated to replace a filtered element. For example, an anchor element including an image element may be replaced by a span element including the same image element. Alternatively, the processing logic of process 600 may update an element by removing or changing attributes in the element. For example, an image element may be preserved while its attributes specifying borders around an image may be removed. Similarly, a table element may be preserved while its attributes specifying space alignments may be removed.

In another embodiment, the processing logic of process 600 may delay determining whether to filter an element encountered during a top down traversal of a DOM structure after the traversal is complete. The processing logic of process 600 may retain the element for later consideration via a hashing mechanism during the traversal. For example, certain types of elements (e.g. as configured) retained for later consideration on relevancy to article content in an article node may include division elements, table elements, ordered list elements, object elements, font elements, and/or heading elements (e.g. based on tags such as <DIV>, <TABLE>, <OL>, <OBJECT>, <FONT>, <H1>, <H2> . . . ), etc. At the end of the traversal, the processing logic of process 600 may determine, according to certain embodiments, whether a heading element relates to a title of the article content, e.g. based on string comparison for similarity measurement. The heading element may then be preserved if it is not related to the title of the article content.

At block 609, in one embodiment, the processing logic of process 600 may update a DOM structure already pruned and impose a presentation style for presenting article context in a reader mode. The presentation style may be based on a user interface configuration, such as in reader mode configurations 121 of FIG. 1, and style attributes incorporated or tracked during a DOM tree traversal when pruning the DOM structure. Subsequently, at block 611, the processing logic of process 600 may present the article content in the reader mode according to the updated DOM structure while optionally preloading a next page of the article content according to a next page element previously identified from an original web page for the DOM structure.

Figure 7:
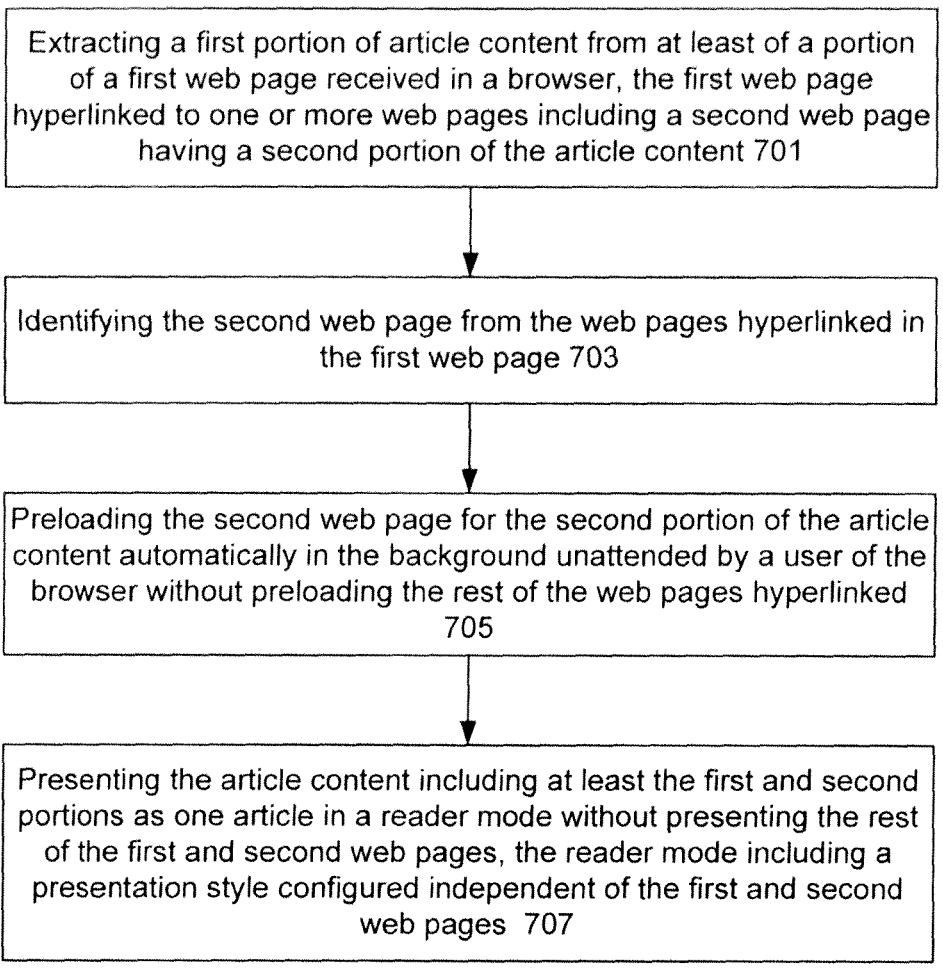
FIG. 7 is a flow diagram illustrating one embodiment of a process to preload web content for presentation in a reader mode.

FIG. 7 is a flow diagram illustrating one embodiment of a process to preload web content for presentation in a reader mode. Exemplary process 700 may be performed by a processing logic that may comprise hardware (circuitry, dedicated logic, etc.), software (such as is run on a dedicated machine), or a combination of both. In one embodiment, process 700 may be performed according to some components of system 100 of FIG. 1. At block 701, the processing logic of process 700 may extract a first portion of article content from at least a portion of a first web page received in a browser. The first web page may be hyperlinked to other web pages including a second web page having a second portion of the article content. For example, a next page element in the first web page may include a link to a next page of the article content presented in the first web page. At block 703, the processing logic of process 700 may identify the second web page hyperlinked in the first web page. The processing logic of process 700 may detect the next page element among anchor elements included in the first web page to select the second web page for the article content.

In one embodiment, at block 705, the processing logic of process 700 may automatically preload a second web page hyperlinked with a first web page in the background unattended by a user of a browser without preloading the rest of web pages hyperlinked in the second web page. The rest of web pages hyperlinked from the first web page (i.e. except the link to the second web page) may not be loaded. The processing logic of process 700 may present at least a portion of content from the first web page while preloading the second web page. For example, the processing logic of process 700 may present a visually non-empty portion of the content in the first web page. Alternatively, the processing logic of process 700 may present a first portion of article content extracted from the first web page while excluding other elements (i.e. irrelevant to the article content) from the first web page for presentation. The browser may be capable of retrieving the second web page in response to a user action (e.g. a mouse click) on a hyperlink item provided via a next page element of the first web page. In some embodiments, all pages hyperlinked with the first web page may be automatically preloaded without waiting for user actions (e.g. regardless which pages have been presented to the user).

At block 707, the processing logic of process 700 may present at least a first portion and a second portion of article content extracted from a first and second web pages respectively as one article in a reader mode without presenting the rest of the first and second web pages. The reader mode may include a presentation or user interface style, such as in reader mode configurations 121 of FIG. 1, preconfigured independent of web pages. The first and second portions of the article content may be presented in a seamless manner to allow a user to scroll through different portions of the article content as if the article content is based on a single content source. In one embodiment, the article content (or an article's content) may be displayed based on a presentational style of a reader mode using one single column window with up/down scroll bar control. A user may browse through different portions or pages of the article content using the scroll bar control without being aware that these different portions or pages may be extracted or generated from different hyperlinked web pages. The processing logic of process 700 may perform similar operations on the first, second web pages and/or other hyperlinked web pages to extract portions of article content and preload subsequent portions of the article content. For example, the second web page may be hyperlinked to a third web page including a third portion of the article content. The processing logic of process 700 may automatically preload the third web page when at least a portion of the second portion of the article content is visible on a display screen presenting the article content in the reader mode.

Figure 8A:
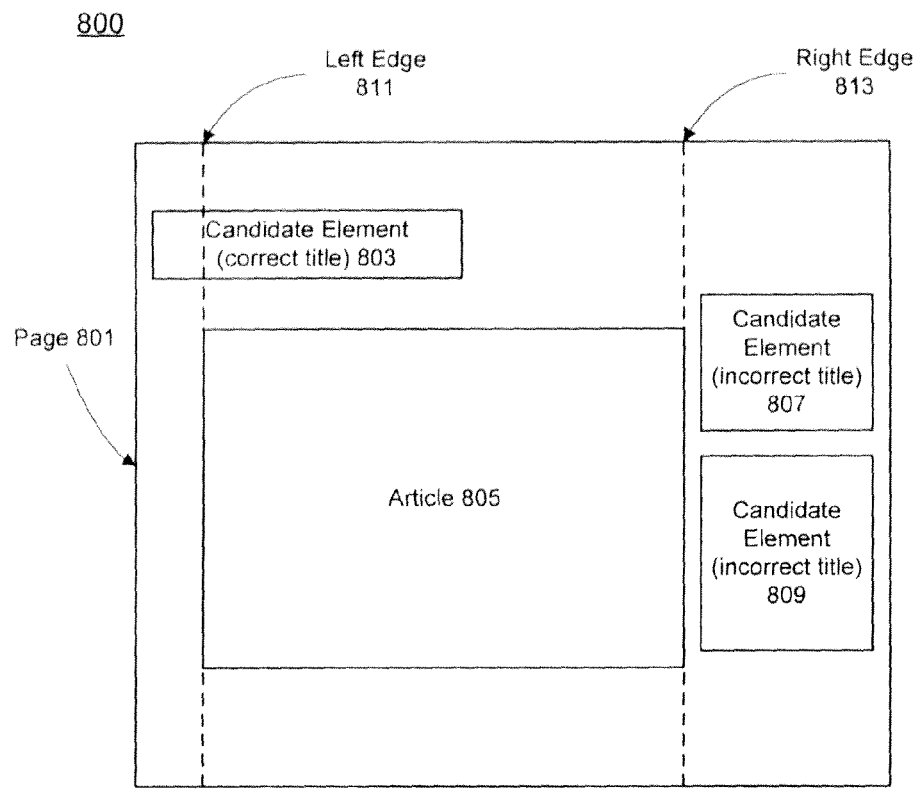
FIGS. 8A-8B are diagrams illustrating sample measurements for detecting a title for web content in a reader mode.
Figure 8B:
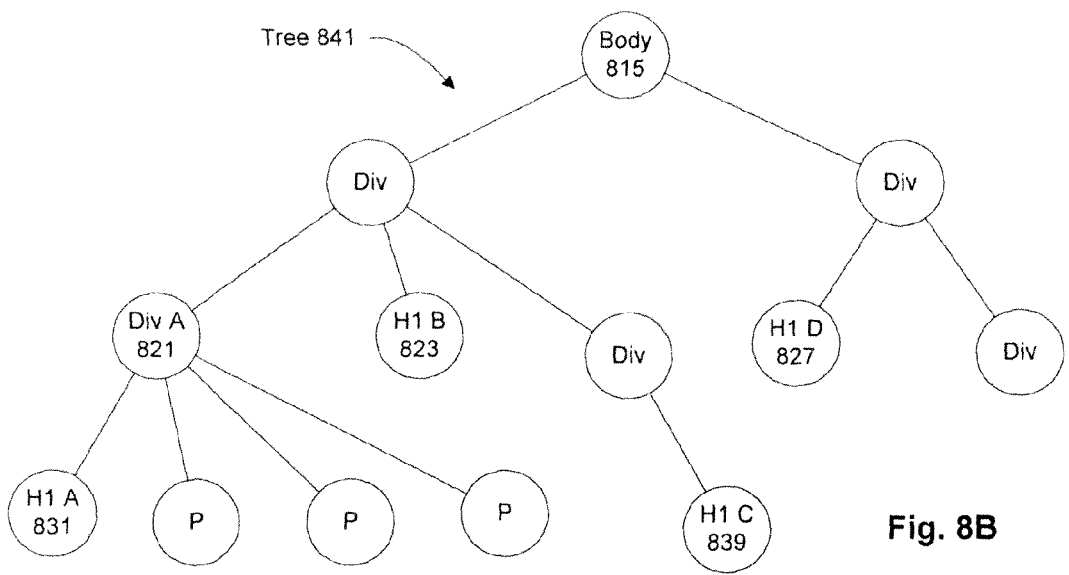

FIG. 8A-8B are diagrams illustrating sample measurements for detecting a title for web content in a reader mode. For example, diagram 800 may be presented according to some components of system 100 of FIG. 1. In one embodiment, page 801 in FIG. 8A may represent web content or a web page displayed on a display screen according by a browser. Page 801 may include an article element article 805, which may include one or more paragraphs of texts. Additionally, page 801 may include elements 803, 807, 809 which might be selected as candidate elements (e.g. heading elements) for identifying a title for article content in article 805.

In one embodiment, title detection may be based on horizontal space or a horizontal bound to render an article element. For example, a horizontal bound of article 805 may be specified according to left edge 811 as the minimum X coordinate and right edge 813 as the maximum X coordinate of article 805. Candidate elements with a geometric center along X coordinate outside the horizontal bound may be disqualified during title detection. For example, candidate elements 807, 809 may include incorrect titles as both are disqualified for being located with geometric centers along X coordinate (or horizontal geometric center) falling outside the horizontal bound of article 805. In contrast, candidate element 803 including a correct title for article 805 may be located with its horizontal geometric center within the horizontal bound of article 805.

Turning now to FIG. 8B, tree 841 rooted at body 815 may represent an exemplary DOM structure having DOM distances between DOM nodes. For example, a DOM distance between two DOM nodes within tree 841 may be based on the least number of DOM nodes to be traversed from one of the DOM nodes to the other of the DOM nodes. To illustrate, DOM distance from node h1 a 831 to node div a 821 may be 1; DOM distance from node h1 b 823 to node div a 821 may be 2; DOM distance from node h1 c 839 to node div a 821 may be 3; DOM distance from h1 d 827 to node diva 821 may be 4.

Figure 9A:
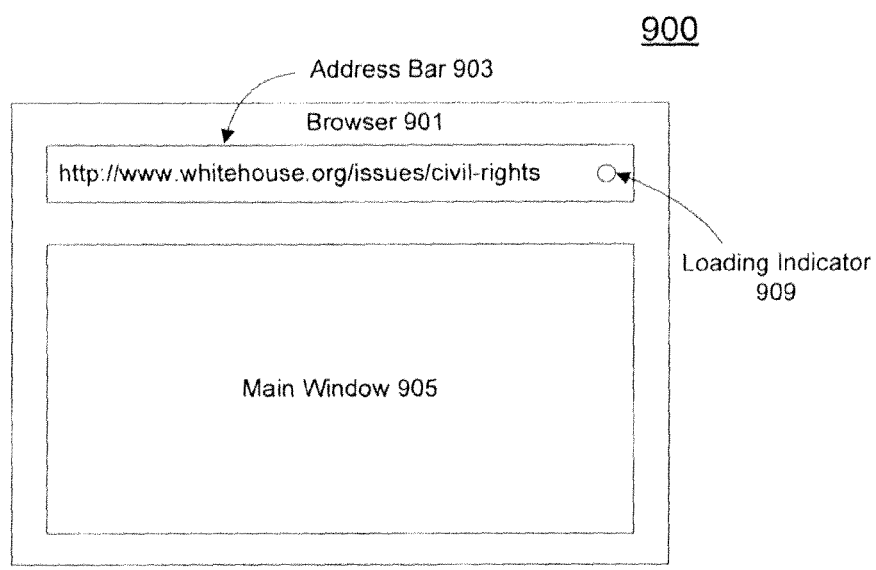
FIGS. 9A-9B are sample diagrams illustrating sample user interfaces including reader indicator.
Figure 9B:
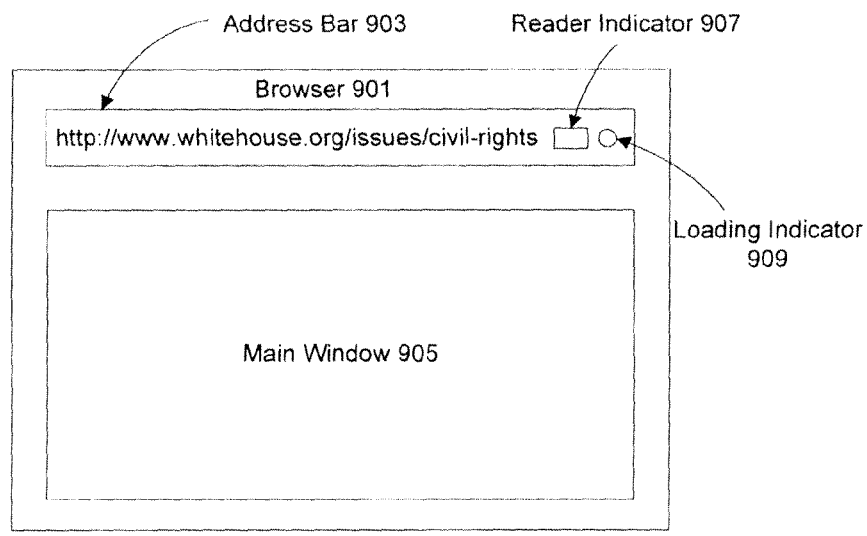

FIGS. 9A-9B are sample diagrams illustrating sample user interfaces including reader indicator. For example, diagram 900 may be presented according to some components of system 100 of FIG. 1. In one embodiment, browser 901 may receive a URL in an address bar 903 to retrieve a web page addressed by the URL. Browser 901 may render retrieved content in main window 905 prior to completing the retrieval of the web page. Loading indicator 909 may indicate that the web page is being loaded and the loading is not yet complete at time T1 913. Browser 901 may not yet detect availability of an article for the web page at time T1 913.

Turning now to FIG. 9B, browser 901 may present reader indicator 907 to a user after detecting availability of an article from a web page addressed in address bar 903 while continuing loading the web page. Reader indicator 907 may be a user interface button allowing a user to activate a presentation of the article in a reader mode even prior to browser 901 completely loading all resources of the web page. Loading indicator 909 may disappear when loading of the web page is completed. While reader indicator 907 may stay in address bar 903, for example, until when a new URL is registered in address bar 903 for retrieving a separate web page.

Figure 10:
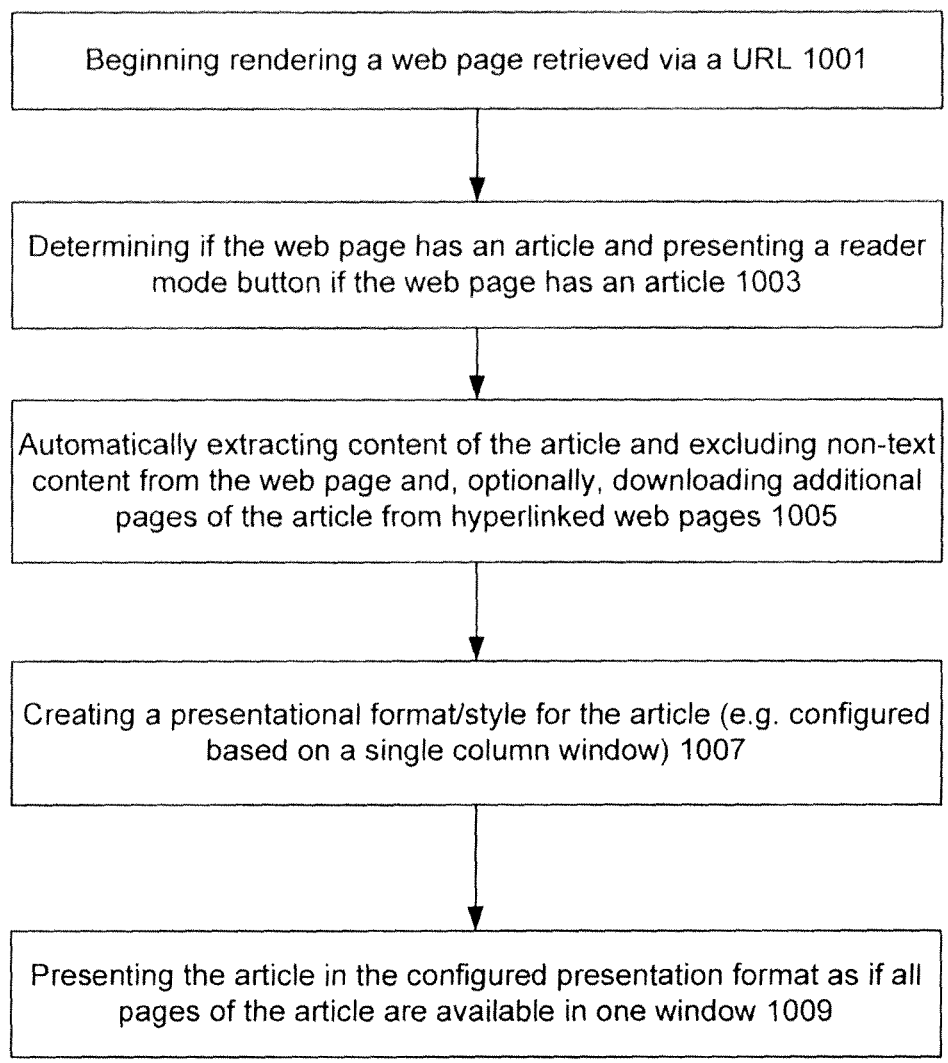
FIG. 10 is a flow diagram illustrating one embodiment of a process to present an article of a web page in a reader mode.

FIG. 10 is a flow diagram illustrating one embodiment of a process to present an article of a web page in a reader mode. Exemplary process 1000 may be performed by a processing logic that may comprise hardware (circuitry, dedicated logic, etc.), software (such as is run on a dedicated machine), or a combination of both. In one embodiment, process 1000 may be performed according to some components of system 100 of FIG. 1. At block 1001, the processing logic of process 1000 may begin rendering a web page retrieved via an URL, such as registered in a browser by a user. The processing logic of process 1000 may begin rendering the web page prior when available content from the web page is ready for rendering before all resources for the web page are loaded.

At block 1003, the processing logic of process 1000 may determine if a web page being downloaded has an article. If the web page includes an article, the processing logic of process 1000 may present a reader mode button to allow a user to access the article in a reader mode via a presentational format convenient to access the article's content without accessing the rest of the web page. The reader mode button may not be presented if no article is detected in the web page. The processing logic of process 1000 may continue rendering the web page with the reader mode button presented.

In one embodiment, at block 1005, the processing logic of process 1000 may extract (text) content of an article and exclude non-text content from a web page, for example, in response to a user activation of a reader mode button for accessing the article's content in a reader mode. In some embodiments, certain non-text content, such as selected images which are deemed relevant to the article, may be retained for the reader mode. The processing logic of process 1000 may detect availability of the article's content in the web page without extracting the article's content from the web page if the reader mode button is not activated. Optionally, the processing logic of process 1000 may automatically download additional pages of the article from hyperlinked web pages transparent to the user.

At block 1007, the processing logic of process 1000 may create a presentational format/style for presenting an article extracted from a web page in a reader mode. For example, the presentational format may include a single column or multiple columns of windows configured with a title portion and a body portion of the article. Font specifications for the title portion and the body portion may differ based on a configuration of the reader mode or dynamically adjusted following style specifications in the web page (e.g. using a bold font). The processing logic of process 1000 may lay out a DOM tree representing an article presented in a reader mode. Subsequently, at block 1009, the processing logic of process 1000 can present the article in the configured presentation format as if all pages of the article are available in one window.

Figure 11:
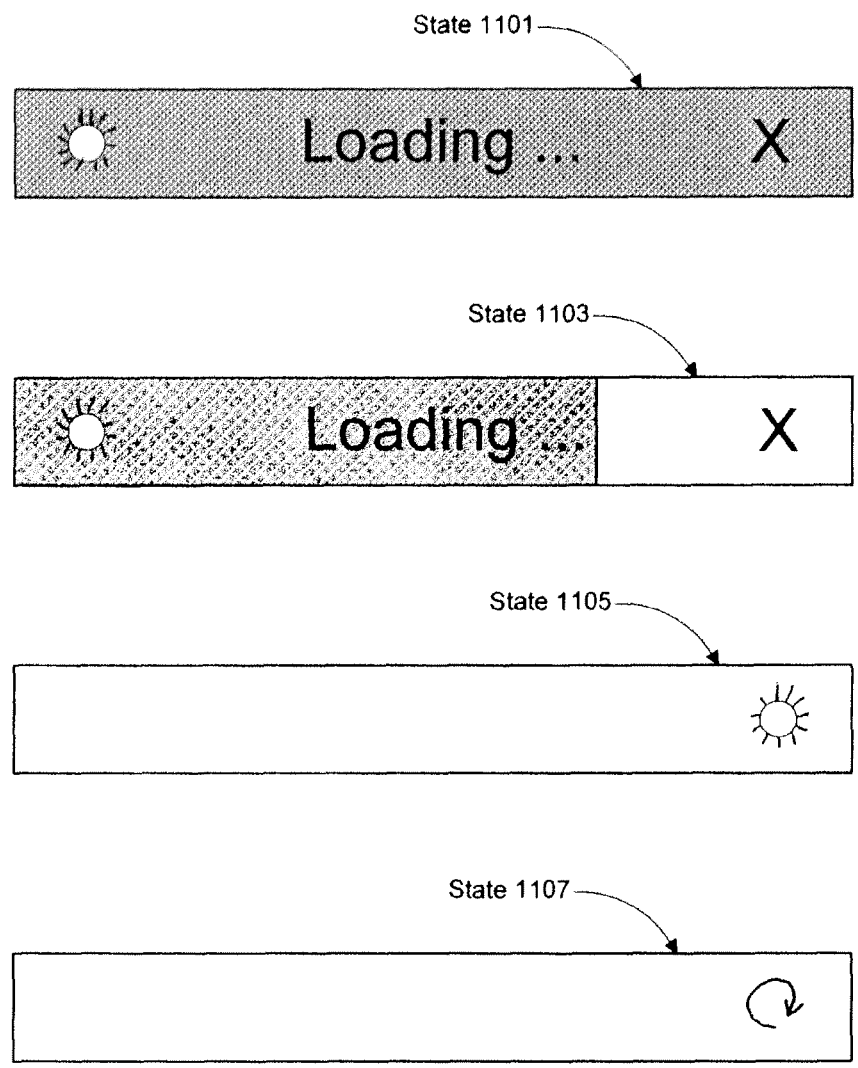
FIG. 11 is a block diagram illustrating exemplary progress indicators for a content viewing application.

FIG. 11 is a block diagrams illustrating exemplary progress indicators for a content viewing application. For example, progress indicators 1100 may indicate different states of retrieving content, such as a web page, for presentation in a content viewing application, such as application 101 of FIG. 1. Progress indicators 1100 may be presented in a user interface for a content viewing application, such as via presentation module 119 of FIG. 1. As shown, state 1101 may include an element resembling a spinning gear, an element indicating that the web page is loading, and an "X" may be a button that allows a user to cancel the current download. The spinning gear may dynamically indicate a current rate at which content data is being loaded into the content viewing application (e.g. a browser). In particular, state 1101 may show progress indicated with a darker background. State 1103 may show further progress indicated in a lighter background. In one embodiment, State 1103 may include a moving bar for dynamic representation of the progress (e.g. moving to the right as more content arrives). The difference in the backgrounds may be intended to be visually noticeable such that a user will readily distinguish the different between the two backgrounds and, hence, the difference between the two states 1101 and 1103.

In various embodiments, states 1101 might indicate to the user that the web browser is actively retrieving the requested web page content, but none of the requested content is currently available for viewing on the web browser display. In contrast, state 1103 may indicate that some portion of usable content is available for viewing on the web browser application. In one embodiment, usable content comprises one or more of text, an image, a plug-in, and/or a canvas element visible as visually no-empty components on a viewing area (e.g. a display window) of the web browser. State 1103 may indicate a progress of loading additional portion of the usable content via a spinning gear and/or a moving extent of the background bar (e.g. a loading indicator) as more and more of the usable content become available. In this way, as a user clicks anew link (or types in a web address and hits "return") and begins to wait for the page to download, state 1101 and state 1103 can provide a more accurate cue to the user that different levels of progress have been made towards of downloading the requested page. In some embodiments, state 1103 may include a spinning gear without a moving bar.

State 1105 may illustrate an embodiment of a state where a major portion of the requested web page has been downloaded when a delay is encountered in completing the download. State 1105 may include a spinning indicator to indicate content download is still on going.

In one embodiment, a major portion of the requested web page may indicate a visually non empty layout has been rendered (e.g. visible) in a browser for the requested web page and if a main frame (e.g. an HTML document) of the request web page has loaded. Typically, there may be enough content from the requested web page to render a display screen with texts. In one embodiment, a progress indicator may be associated with state 1103 when the major portion of the requested web page has been downloaded. If sub resources being retrieved for the requested web page, such as images/videos, are not loading (e.g. after being stalled for a period of time, such as 2 ms), the progress indicate may switch from state 1103 to state 1105. Loading indicator may change color (e.g. from blue to white) switching from state 1103 to state 1105. In some embodiments, a spinning loading indicator may replace a cancel button "X" in state 1105 to signal to the user a majority of the content has been loaded without a need to cancel the download. Thus, the user's attention can be directed to a viewing window without a need for the user to wait for a remaining portion of the content. As a result, when a bulk of content for a request web page has been loaded with the remaining residual portions yet to arrive, state 1105 may prevent a user from unnecessary waiting as most useful content has been available to the user.

State 1107 illustrates an embodiment of a state where the requested web page has been fully downloaded and is fully available for display on the viewable screen. In other words, state 1107 indicates that loading of the web page is complete. Thus, there is no loading indicator, no spinning gear, and no "X" that a user can click to stop the downloading, because the downloading is already complete. State 1107 does include a re-load icon that allows the user to click to re-load the web page, if desired. The particular elements of states 1103, 1105 and 1107 are not intended to be limiting in any way. One of skill in the art will recognize that any variety of distinct display elements could be used to indicate different progress states. However, it is important to have sufficient distinction between the progress indicator states to allow a user to readily ascertain the difference between the various states.

Figure 12:
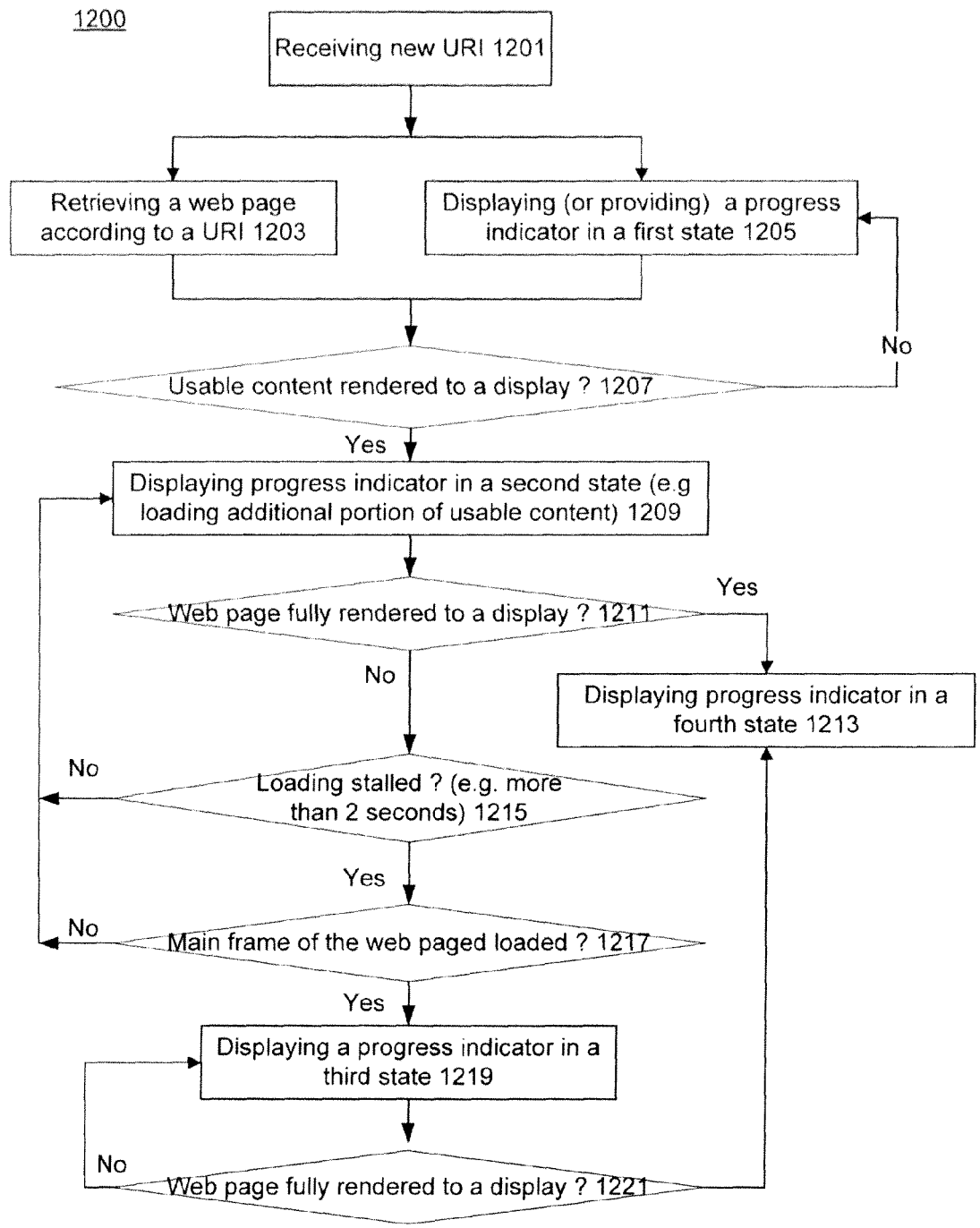
FIG. 12 is a flow diagram illustrating one embodiment of a process to indicate a majority of content has been retrieved for a document addressed in a content viewing application.

FIG. 12 is a flow diagram illustrating one embodiment of a process to indicate a majority of content has been retrieved for a document addressed in a content viewing application It should be noted that more or fewer steps than those shown in FIG. 12 could be implemented in different embodiments. Exemplary process 1200 may be performed by a processing logic that may comprise hardware (circuitry, dedicated logic, etc.), software (such as is run on a dedicated machine), or a combination of both. For example, process 1200 may be performed by some components of system 100 of FIG. 1. At block 1201, the processing logic of process 1200 can receive a new URI (Universal Resource Indicator) or URL addressing a web page or document. A URI may be a resource address registered by a user via a web browser whenever the user clicks a link on a web page or when the user enters (e.g., by typing) anew address (e.g., www.apple.com) in a browser address bar.

In response, the processing lock of process 1200 may begin retrieving content including the requested web page at block 1203 and display a progress indicator in a first state 1205, such as state 1101 of FIG. 11. Loading the requested web page (or retrieving the content) may include requesting a resource from a source in addition to receiving data from the source. Thus, as discussed previously, the first state of the progress indicator may correspond to the initiation request and/or commencement of retrieving data for the requested web page.

The processing logic of process 1200 may monitor any layouts being generated and determine whether any usable content is rendered to a display screen at block 1207. If there is currently no usable content available (e.g., rendered) to the display screen, then the processing logic of process 1200 may continue to display the progress indicator in the first state.

Alternatively, at block 1209, if usable content has been rendered to a display screen, then the processing logic of process 1200 may display the progress indicator in the second state, such as state 1103 of FIG. 11. In various embodiments, usable content may be determined based on the existence of a visually non-empty layout generated by a content viewing application. In other words, a layout having data associated with it may not necessarily be visually non-empty. However, if the layout includes data that corresponds to text, images, plug-ins, canvas elements, etc., then the layout may be visually non-empty.

While the progress indicator is being displayed in the second state, the processing logic of process 1200 may continue monitoring the download of content and/or the layout generation and determine whether the web page is fully rendered to the display at block 1211. If the web page has been fully rendered to the display screen, then at block 1213, the processing logic of process 1200 may display the progress indicator in the fourth state, such as in state 1107 of FIG. 11. The processing logic of process 1200 may determine that a download is complete based on information indicating that a final packet has been received from the source or that there are no more layouts to be generated or that there are no more layouts to be rendered to the display.

If the web page is not fully rendered to the display, then the processing logic of process 1200 may determine whether a download or retrieval of content for the web page has been stalled at block 1215. The processing logic of process 1200 may detect a progress of loading additional portion of usable content is stalled. In one embodiment, the processing logic of process 1200 may monitor a time lapse waiting for a next packet data since receiving the last packet data for the download. If the time lapse is longer than a threshold period (e.g. 2 seconds as configured), a stall may be detected. If the download is not stalled, the processing logic of process 1200 may continue to display the progress indicator in the second state at block 1209. The processing logic of process 1200 may update an extent of a progress bar for the progress indicator in the second state to reflect an amount of content already downloaded relative to a total amount of content expected for the web page.

If the download of a web page is stalled, the processing logic of process 1200 may determine whether a main frame of the web page has been fully retrieved at block 1217. The main frame of the web page may be a first document retrieved when downloading the web page. For example, the main frame may be an HTML document received in response to a request sent to the URL associated with the web page. If the main frame has not been loaded, the processing logic of process 1200 may continue to display the progress indicator in the second state at block 1209.

Otherwise, at block 1219, the processing logic of process 1200 may display the progress indicator in a third state, such as state 1105 of FIG. 11, for example, to allow a user to interact with a browser according to the requested web page. In one embodiment, distraction of retrieval status may be minimized as the user interacts with a layout rendered on a display with a major portion of content for the web page. Subsequently, the processing logic of process 1200 may continue to monitor if the web page is fully rendered to the display at block 1221. If the web page has been fully rendered to the display screen, then at block 1213, the processing logic of process 1200 may display the progress indicator in the fourth state. Otherwise, the processing logic of process 1200 may continue to display the progress indicator in the third state at block 1219.

Figure 13:
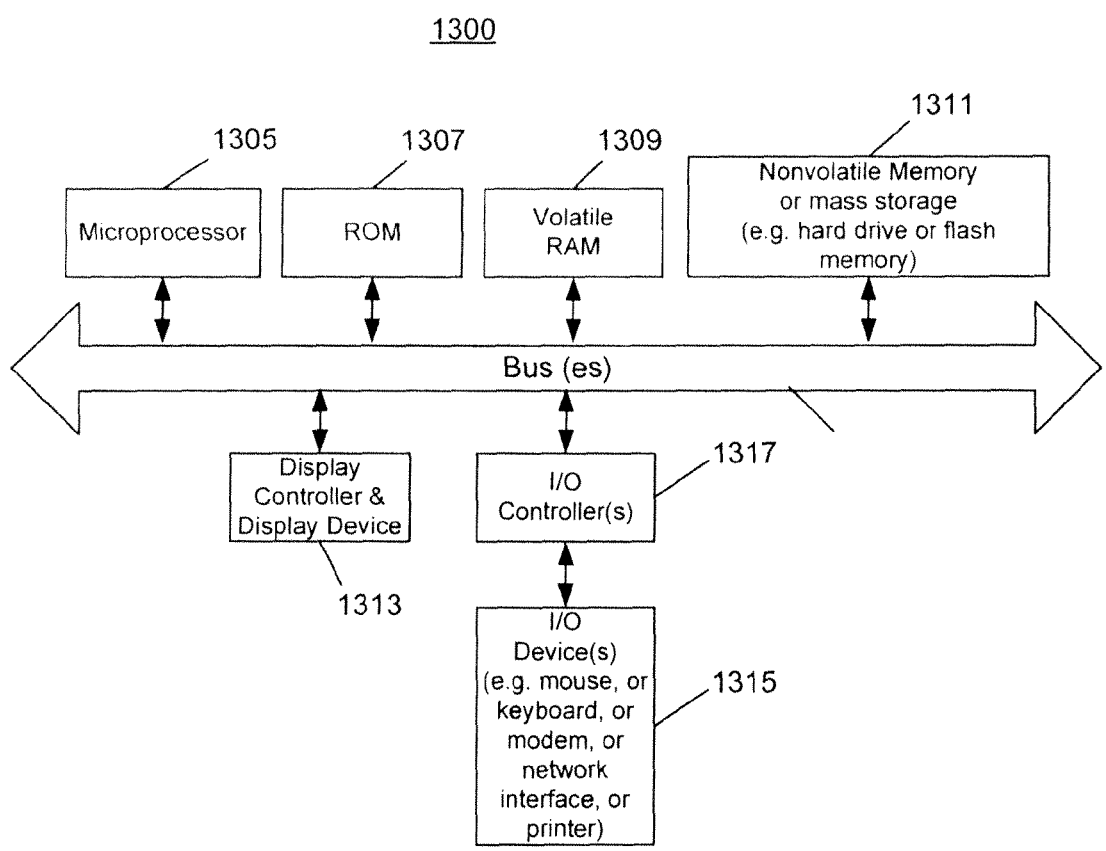
FIG. 13 illustrates one example of a data processing system such as a computer system, which may be used in conjunction with the embodiments described herein.

FIG. 13 shows one example of a data processing system such as a computer system, which may be used with one embodiment the present invention. For example, the system 1300 may be implemented as a part of the system shown in FIG. 1. Note that while FIG. 13 illustrates various components of a computer system, it is not intended to represent any no particular architecture or manner of interconnecting the components as such details are not germane to the present invention. It also be appreciated that network computers and other data processing systems which have fewer components or perhaps more components may also be used with the present invention.

As shown in FIG. 13, the computer system 1300, which is a form of a data processing system, includes a bus 1303 which is coupled to a microprocessor(s) 1305 and a ROM (Read Only Memory) 1307 and volatile RAM 1309 and a non-volatile memory 1311. The microprocessor 1305 may retrieve the instructions from the memories 1307, 1309, 1311, and execute the instructions to perform operations described above. The bus 1303 interconnects these various components together and also interconnects these components 1305, 1307, 1309, and 1311 to a display controller and display device 1313 and to peripheral devices such as input/output (I/O) devices which may be mice, keyboards, modems, network interfaces, printers and other devices which are well known in the art. Typically, the input/output devices 1315 are coupled to the system through input/output controllers 1317. The volatile RAM (Random Access Memory) 1309 is typically implemented as dynamic RAM (DRAM) which requires power continually in order to refresh or maintain the data in the memory.

The mass storage 1311 is typically a magnetic hard drive or a magnetic optical drive or an optical drive or a DVD RAM or a flash memory or other types of memory systems which maintain data (e.g. large amounts of data) even after power is removed from the system. Typically, the mass storage 1311 will also be a random access memory although this is not required. While FIG. 13 shows that the mass storage 1311 is a local device coupled directly to the rest of the components in the data processing system, it will be appreciated that the present invention may utilize a non-volatile memory which is remote from the system, such as a network storage device which is coupled to the data processing system through a network interface such as a modem or Ethernet interface or wireless networking interface. The bus 1303 may include one or more buses connected to each other through various bridges, controllers and/or adapters as is well known in the art.

Portions of what was described above may be implemented with logic circuitry such as a dedicated logic circuit or with a microcontroller or other form of processing core that executes program code instructions. Thus processes taught by the discussion above may be performed with program code such as machine-executable instructions that cause a machine that executes these instructions to perform certain functions. In this context, a "machine" may be a machine that converts intermediate form (or "abstract") instructions into processor specific instructions (e.g., an abstract execution environment such as a "virtual machine" (e.g., a Java Virtual Machine), an interpreter, a Common Language Runtime, a high-level language virtual machine, etc.), and/or, electronic circuitry disposed on a semiconductor chip (e.g., "logic circuitry" implemented with transistors) designed to execute instructions such as a general-purpose processor and/or a special-purpose processor. Processes taught by the discussion above may also be performed by (in the alternative to a machine or in combination with a machine) electronic circuitry designed to perform the processes (or a portion thereof) without the execution of program code.

An article of manufacture may be used to store program code. An article of manufacture that stores program code may be embodied as, but is not limited to, one or more memories (e.g., one or more flash memories, random access memories (static, dynamic or other)), optical disks, CD-ROMs, DVD ROMs, EPROMs, EEPROMs, magnetic or optical cards or other type of machine-readable media suitable for storing electronic instructions. Program code may also be downloaded from a remote computer (e.g., a server) to a requesting computer (e.g., a client) by way of data signals embodied in a propagation medium (e.g., via a communication link (e.g., a network connection)).

The preceding detailed descriptions are presented in terms of algorithms and symbolic representations of operations on data bits within a computer memory. These algorithmic descriptions and representations are the tools used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be kept in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "processing" or "computing" or "calculating" or "detet ining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations described herein. This apparatus may be specially constructed for the required purpose, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), RAMs, EPROMs, EEPROMs, magnetic or optical cards, or any type of media suitable for storing electronic instructions, and each coupled to a computer system bus.

The processes and displays presented herein are not inherently related to any particular computer or other apparatus. Various general-purpose systems may be used with programs in accordance with the teachings herein, or it may prove convenient to construct a more specialized apparatus to perform the operations described. The required structure for a variety of these systems will be evident from the description below. In addition, the present invention is not described with reference to any particular programming language. It will be appreciated that a variety of programming languages may be used to implement the teachings of the invention as described herein.

The foregoing discussion merely describes some exemplary embodiments of the present invention. One skilled in the art will readily recognize from such discussion, the accompanying drawings and the claims that various modifications can be made without departing from the spirit and scope of the invention.

What is claimed is:

1. A computer implemented method for presenting a web page in a browser, the method comprising:
   receiving content for the web page;
   while receiving the content for the web page:
      determining a retrieval status of the content for the web page addressed by a URL (Universal Resource Locator), wherein the retrieval status indicates a first portion of the content that has been received and an additional portion of the content that has not yet been received; and
      in accordance with a determination that the first portion of the content that has been received is sufficient to allow the browser to render a default presentation of the web page based on the first portion of the content, analyzing the content using one or more predefined heuristics to determine whether article content is included in the content; and
   in accordance with a determination that article content is included in the content, presenting a reader indicator in a user interface of the browser, the reader indicator indicating availability of an alternative presentation of the web page that includes the article content and excludes at least a portion of other content of the web page, distinct from the default presentation, that is rendered by the browser in response to a selection of the reader indicator, wherein the reader indicator is absent from the user interface of the browser if the alternative presentation is not available.

2. The method of claim 1, wherein the web page includes a plurality of hypertext elements and wherein the determination of the retrieval status comprises:
   determining if the plurality of hypertext elements have been received.

3. The method of claim 2, wherein the plurality of hypertext elements are rendered in the user interface, and the method further comprises:
   determining if the hypertext elements rendered are visually non-empty in the user interface.

4. The method of claim 1, further comprising:
   building a DOM (document object model) tree of nodes from the content retrieved; and
   laying out the DOM tree to assign geometric parameters for the nodes to present the content in the user interface.

5. The method of claim 4, wherein analyzing the content using one or more predefined heuristics to determine whether article content is included in the content comprises:
   selecting a candidate node from the nodes in the DOM tree to represent the article content; and
   determining if the candidate node is disqualified to represent the article content, wherein the availability of the alternative presentation of the web page that includes the article content and excludes at least a portion of other content of the web page is detected if the candidate node is not disqualified.

6. The method of claim 5, wherein the selecting the candidate node comprises:
   assigning scores to the nodes of the DOM tree, each score indicating a level of likelihood of the article content for the corresponding node, wherein the candidate node is scored highest among the nodes.

7. The method of claim 5, wherein determining if the candidate node is disqualified comprises:
   evaluating one or more heuristic conditions in sequence on the candidate node, wherein the candidate node is disqualified if at least one of the heuristics conditions is applicable.

8. The method of claim 7, wherein the evaluation of the heuristic conditions uses progressively more processing resources according to the sequence.

9. The method of claim 1, wherein presenting the reader indicator includes presenting the reader indicator, which indicates availability of the alternative presentation of the web page that includes the article content and excludes at least a portion of other content of the web page, while continuing to receive the content for the web page.

10. The method of claim 1, further comprising: before analyzing the content, rendering the default presentation of the web page based on the first portion of the content.

11. The method of claim 10, further comprising: after rendering the default presentation of the web page based on the first portion of the content, waiting for a delay period before beginning the analyzing of the content.

12. A non-transitory computer readable storage medium having instructions stored thereon that, when executed, cause a computer to:
   receive content for the web page;
   while receiving the content for the web page:
      determine a retrieval status of the content for the web page addressed by a URL (Universal Resource Locator), wherein the retrieval status indicates a first portion of the content that has been received and an additional portion of the content that has not yet been received; and
      in accordance with a determination that the first portion of the content that has been received is sufficient to allow the browser to render a default presentation of the web page based on the first portion of the content, analyze the content using one or more predefined heuristics to determine whether article content is included in the content; and
   in accordance with a determination that article content is included in the content, present a reader indicator in a user interface of the browser, the reader indicator indicating availability of an alternative presentation of the web page that includes the article content and excludes at least a portion of other content of the web page, distinct from the default presentation, that is rendered by the browser in response to a selection of the reader indicator, wherein the reader indicator is absent from the user interface of the browser if the alternative presentation is not available.

13. The non-transitory computer readable storage medium of claim 12, wherein the instructions that, when executed, cause the computer to present the reader indicator include instructions that, when executed, cause the compute to present the reader indicator, which indicates availability of the alternative presentation of the web page that includes the article content and excludes at least a portion of other content of the web page, while continuing to receive the content for the web page.

14. The non-transitory computer readable storage medium of claim 12, wherein the instructions further comprise instructions that, when executed, cause the computer to, before analyzing the content, render the default presentation of the web page based on the first portion of the content.

15. The non-transitory computer readable storage medium of claim 14, wherein the instructions comprise instructions that, when executed, cause the computer to: after rendering the default presentation of the web page based on the first portion of the content, waiting for a delay period before beginning the analyzing of the content.

16. An apparatus, comprising:
a memory storing executable instructions including a browser;
a user interface device including a display screen;
a processor coupled to the user interface device and the memory to execute the executable instructions from the memory for presenting a document corresponding to a web page in the browser, the processor being configured to:
receive content for the web page;
while receiving the content for the web page:
determine a retrieval status of the content for the web page addressed by a URL (Universal Resource Locator), wherein the retrieval status indicates a first portion of the content that has been received and an additional portion of the content that has not yet been received; and
in accordance with a determination that the first portion of the content that has been received is sufficient to allow the browser to render a default presentation of the web page based on the first portion of the content, analyze the content using one or more predefined heuristics to determine whether article content is included in the content; and
in accordance with a determination that article content is included in the content, present a reader indicator in a user interface of the browser, the reader indicator indicating availability of an alternative presentation of the web page that includes the article content and excludes at least a portion of other content of the web page, distinct from the default presentation, that is rendered by the browser in response to a selection of the reader indicator, wherein the reader indicator is absent from the user interface of the browser if the alternative presentation is not available.

17. The apparatus of claim 16, wherein presenting the reader indicator includes presenting the reader indicator, which indicates availability of the alternative presentation of the web page that includes the article content and excludes at least a portion of other content of the web page, while continuing to receive the content for the web page.

18. The apparatus of claim 16, wherein the processor is further configured to:
before analyzing the content, rendering the default presentation of the web page based on the first portion of the content.

19. The apparatus of claim 18, wherein the processor is further configured to: after rendering the default presentation of the web page based on the first portion of the content, waiting for a delay period before beginning the analyzing of the content.

* * * * *

UNITED STATES PATENT AND TRADEMARK OFFICE
CERTIFICATE OF CORRECTION

PATENT NO. : 9,355,079 B2
APPLICATION NO. : 14/018218
DATED : May 31, 2016
INVENTOR(S) : Harrison et al.

Page 1 of 1

It is certified that error appears in the above-identified patent and that said Letters Patent is hereby corrected as shown below:

In the claims,

Claim 12, col. 26, line 43, please delete "for the web" and insert --for a web--;

Claim 13, col. 27, line 7, please delete "the compute to" and insert --the computer to--.

Signed and Sealed this
Second Day of August, 2016

Michelle K. Lee
*Director of the United States Patent and Trademark Office*